(12) United States Patent
Foster

(10) Patent No.: US 8,090,634 B2
(45) Date of Patent: Jan. 3, 2012

(54) SYSTEM AND METHOD FOR REAL-TIME PRICING WITH VOLUME DISCOUNTING

(75) Inventor: Robert A. Foster, Brighton (AU)

(73) Assignee: Financial Systems Technology (Intellectual Property) Pty Ltd, Melbourne, Victoria (AU)

( * ) Notice: Subject to any disclaimer, the term of this patent is extended or adjusted under 35 U.S.C. 154(b) by 197 days.

(21) Appl. No.: 12/556,476

(22) Filed: Sep. 9, 2009

(65) Prior Publication Data

US 2010/0004991 A1 Jan. 7, 2010

Related U.S. Application Data

(63) Continuation of application No. 09/785,783, filed on Feb. 16, 2001, now Pat. No. 7,606,744.

(51) Int. Cl.
*G07F 19/00* (2006.01)
(52) U.S. Cl. ........................................................ 705/34
(58) Field of Classification Search .................... 705/30, 705/34
See application file for complete search history.

(56) References Cited

U.S. PATENT DOCUMENTS

| 6,052,672 | A | * | 4/2000 | Foster | 705/35 |
| 6,101,484 | A | * | 8/2000 | Halbert et al. | 705/26.2 |
| 7,593,896 | B1 | * | 9/2009 | Flitcroft et al. | 705/39 |

\* cited by examiner

*Primary Examiner* — Elaine Gort
(74) *Attorney, Agent, or Firm* — Haynes and Boone, LLP

(57) ABSTRACT

A system and method are provided for facilitating real-time pricing with volume discounting. The method includes receiving a request for a real-time price quote for a transaction from a first account. The request is received at a first instance in time during a billing cycle. The method also includes determining a first production service, where the first production service is a component of the transaction, and determining a count of first production service instances representing the first production service in the received transaction. The method further includes determining a billable entity for the transaction, where the billable entity includes one or more related accounts, and the related accounts includes the first account. The method additionally includes determining a total of the first production service instances purchased by the related accounts during the billing cycle up to the first instance in time, where the total includes the count of the first production service instances in the received transaction. The method also includes determining a price applicable to the total of the first production service instances based on a pricing method, and apportioning the price to the received transaction based on the count of the first production service instance in the received transaction. The system includes a computer-readable storage medium that has stored thereon computer instructions that, when executed by a computer, cause the computer to receive a request for a real-time price quote for a transaction. The request is received at a first instance in time during a billing cycle, and the transaction includes a number of first production service instances, where each instance represents a first production service. The computer instructions also cause the computer to determine a total count of production service instances consumed during the billing cycle up to the first instance in time based on a pricing relationship, and determine a billing service appropriate for the first production service. The computer instructions further cause the computer to calculate a price for the first production service from a price table based on a first attribute for the billing service and the total count of production service instances consumed, and apportion the price to the received transaction based on the number of first production service instances in the transaction.

30 Claims, 2 Drawing Sheets

SYSTEM AND METHOD FOR REAL-TIME PRICING WITH VOLUME DISCOUNTING

CROSS REFERENCE TO RELATED APPLICATIONS

The present application is a continuation of U.S. patent application Ser. No. 09/785,783 filed on Feb. 16, 2001, now U.S. Pat. No. 7,606,744 incorporated herein by reference.

RELATED PATENTS

The present application is related to the commonly owned U.S. Pat. No. 6,052,672 entitled "DATA PROCESSING SYSTEM FOR COMPLEX PRICING AND TRANSACTIONAL ANALYSIS," which is hereby incorporated by reference herein in its entirety.

RELATED APPLICATIONS

The present application is related to the co-pending and commonly owned U.S. patent application Ser. No. 09/183,335 entitled "DATA PROCESSING SYSTEM FOR PRICING, COSTING AND BILLING OF FINANCIAL TRANSACTIONS," which is hereby incorporated by reference herein in its entirety.

COMPUTER PROGRAM LISTING APPENDIX

The computer program listing appendix attached hereto consists of two (2) identical compact disks, copy 1 and copy 2, each containing a listing of the software code for embodiments of components of this invention. Each compact disk contains the following files (date and time of creation, size in bytes, filename):

```
Directory of D:\
02/01/01 09:33a    <DIR>       .
02/01/01 09:33a    <DIR>       ..
01/31/01 03:31p    <DIR>       M-9381 US
Directory of D:\M-9381 US
01/31/01 03:31p    <DIR>       .
02/01/01 09:33a    <DIR>       ..
01/31/01 03:24p    <DIR>       CIS
01/31/01 03:27p    <DIR>       COR
01/31/01 03:27p    <DIR>       lib
01/31/01 03:27p    <DIR>       LXN
01/31/01 03:28p    <DIR>       MFS
01/31/01 03:30p    <DIR>       MSC
01/31/01 03:30p    <DIR>       SCRIPTS
01/31/01 03:31p    <DIR>       SQL
01/31/01 03:35p    <DIR>       WEBAPP
Directory of D:\M-9381 US\CIS
01/31/01 03:24p    <DIR>       .
01/31/01 03:31p    <DIR>       ..
01/29/01 12:28p       35,689   BCIS401_CBL.TXT
01/29/01 12:29p       51,724   BCIS411_CBL.TXT
01/29/01 12:29p       13,593   BCIS422_CBL.TXT
01/29/01 10:38a       48,235   ICIS100_CBL.TXT
01/29/01 10:50a       32,018   ICIS100_CPY.TXT
01/29/01 10:38a       44,419   ICIS101_CBL.TXT
01/29/01 10:50a       31,518   ICIS101_CPY.TXT
01/29/01 10:38a       42,227   ICIS102_CBL.TXT
01/29/01 10:51a       25,203   ICIS102_CPY.TXT
01/29/01 10:38a       51,159   ICIS103_CBL.TXT
01/29/01 10:51a       38,667   ICIS103_CPY.TXT
01/29/01 10:38a       46,375   ICIS104_CBL.TXT
01/29/01 10:51a       35,859   ICIS104_CPY.TXT
01/29/01 10:38a       51,279   ICIS106_CBL.TXT
01/29/01 10:51a       38,280   ICIS106_CPY.TXT
01/29/01 10:38a       39,990   ICIS111_CBL.TXT
```

-continued

```
01/29/01 10:51a       25,475   ICIS111_CPY.TXT
01/29/01 10:38a       32,573   ICIS112_CBL.TXT
01/29/01 10:51a       16,025   ICIS112_CPY.TXT
01/29/01 10:38a       40,689   ICIS140_CBL.TXT
01/29/01 10:51a       24,440   ICIS140_CPY.TXT
01/29/01 10:38a       31,169   ICIS141_CBL.TXT
01/29/01 10:51a       16,346   ICIS141_CPY.TXT
01/29/01 10:38a       67,112   ICIS142_CBL.TXT
01/29/01 10:51a       47,991   ICIS142_CPY.TXT
01/29/01 10:38a       43,061   ICIS143_CBL.TXT
01/29/01 10:51a       30,175   ICIS143_CPY.TXT
01/29/01 10:38a       52,646   ICIS190_CBL.TXT
01/29/01 10:51a       35,127   ICIS190_CPY.TXT
01/29/01 10:38a       54,168   ICIS191_CBL.TXT
01/29/01 10:51a       36,971   ICIS191_CPY.TXT
01/29/01 10:38a       69,765   ICIS192_CBL.TXT
01/29/01 10:51a       50,485   ICIS192_CPY.TXT
01/29/01 10:38a       67,750   ICIS193_CBL.TXT
01/29/01 10:51a       49,658   ICIS193_CPY.TXT
01/29/01 10:38a       52,048   ICIS194_CBL.TXT
01/29/01 10:51a       35,084   ICIS194_CPY.TXT
01/29/01 10:39a       72,666   ICIS196_CBL.TXT
01/29/01 10:51a       52,178   ICIS196_CPY.TXT
01/29/01 10:39a       62,728   ICIS199_CBL.TXT
01/29/01 10:51a       45,142   ICIS199_CPY.TXT
01/29/01 10:39a       51,443   ICIS701_CBL.TXT
01/29/01 10:51a       38,177   ICIS701_CPY.TXT
01/29/01 10:39a       72,098   ICIS702_CBL.TXT
01/29/01 10:51a       52,566   ICIS702_CPY.TXT
01/29/01 10:39a       46,680   ICIS703_CBL.TXT
01/29/01 10:51a       33,441   ICIS703_CPY.TXT
01/29/01 10:39a       68,603   ICIS704_CBL.TXT
01/29/01 10:51a       48,149   ICIS704_CPY.TXT
01/29/01 10:39a       49,424   ICIS705_CBL.TXT
01/29/01 10:51a       38,919   ICIS705_CPY.TXT
01/29/01 10:39a       58,596   ICIS706_CBL.TXT
01/29/01 10:51a       41,118   ICIS706_CPY.TXT
01/29/01 10:39a       49,731   ICIS707_CBL.TXT
01/29/01 10:51a       38,992   ICIS707_CPY.TXT
01/29/01 10:39a       62,834   ICIS708_CBL.TXT
01/29/01 10:51a       44,418   ICIS708_CPY.TXT
01/29/01 10:39a       45,267   ICIS709_CBL.TXT
01/29/01 10:52a       27,989   ICIS709_CPY.TXT
01/29/01 10:39a       70,396   ICIS710_CBL.TXT
01/29/01 10:52a       50,847   ICIS710_CPY.TXT
01/29/01 10:39a       50,533   ICIS711_CBL.TXT
01/29/01 10:52a       39,666   ICIS711_CPY.TXT
01/29/01 10:39a       66,244   ICIS712_CBL.TXT
01/29/01 10:52a       47,318   ICIS712_CPY.TXT
01/29/01 10:39a       43,092   ICIS713_CBL.TXT
01/29/01 10:52a       26,459   ICIS713_CPY.TXT
01/29/01 10:39a       73,837   ICIS714_CBL.TXT
01/29/01 10:52a       53,861   ICIS714_CPY.TXT
01/29/01 10:39a       37,260   ICIS717_CBL.TXT
01/29/01 10:52a       20,949   ICIS717_CPY.TXT
01/29/01 10:39a       72,726   ICIS718_CBL.TXT
01/29/01 10:52a       53,256   ICIS718_CPY.TXT
01/29/01 10:39a       70,867   ICIS723_CBL.TXT
01/29/01 10:52a       58,288   ICIS723_CPY.TXT
01/29/01 10:39a       76,278   ICIS724_CBL.TXT
01/29/01 10:52a       55,563   ICIS724_CPY.TXT
01/29/01 10:39a       52,323   ICIS727_CBL.TXT
01/29/01 10:52a       40,879   ICIS727_CPY.TXT
01/29/01 10:39a       72,519   ICIS728_CBL.TXT
01/29/01 10:52a       51,904   ICIS728_CPY.TXT
01/29/01 10:39a       69,747   ICIS729_CBL.TXT
01/29/01 10:52a       56,052   ICIS729_CPY.TXT
01/29/01 10:39a       73,137   ICIS730_CBL.TXT
01/29/01 10:52a       52,659   ICIS730_CPY.TXT
01/29/01 10:39a       50,833   ICIS731_CBL.TXT
01/29/01 10:52a       39,710   ICIS731_CPY.TXT
01/29/01 10:39a       65,788   ICIS732_CBL.TXT
01/29/01 10:52a       46,050   ICIS732_CPY.TXT
01/29/01 10:39a       64,002   ICIS999_CBL.TXT
01/29/01 10:52a       45,683   ICIS999_CPY.TXT
01/29/01 12:32p       46,994   LCIS401_CBL.TXT
01/29/01 12:32p       27,233   LCIS402_CBL.TXT
01/29/01 12:32p       24,540   LCIS403_CBL.TXT
01/29/01 12:32p       23,580   LCIS404_CBL.TXT
01/29/01 12:32p       23,940   LCIS405_CBL.TXT
```

-continued

| | | |
|---|---:|---|
| 01/29/01 12:32p | 28,032 | LCIS406_CBL.TXT |
| 01/29/01 12:32p | 22,800 | LCIS407_CBL.TXT |
| 01/29/01 12:33p | 21,556 | LCIS408_CBL.TXT |
| 01/29/01 12:33p | 33,308 | LCIS409_CBL.TXT |
| 01/29/01 12:33p | 31,048 | LCIS411_CBL.TXT |
| 01/29/01 12:33p | 21,525 | LCIS428_CBL.TXT |
| 01/29/01 12:33p | 21,497 | LCIS429_CBL.TXT |
| 01/29/01 12:33p | 34,823 | LCIS430_CBL.TXT |
| 01/29/01 12:33p | 32,605 | LCIS431_CBL.TXT |
| 01/29/01 12:33p | 27,771 | LCIS432_CBL.TXT |
| 01/29/01 12:33p | 29,055 | LCIS433_CBL.TXT |
| 01/29/01 12:34p | 27,890 | LCIS434_CBL.TXT |
| 01/29/01 12:34p | 23,259 | LCIS440_CBL.TXT |
| 01/29/01 12:34p | 22,995 | LCIS441_CBL.TXT |
| 01/29/01 12:34p | 23,029 | LCIS442_CBL.TXT |
| 01/29/01 12:34p | 23,025 | LCIS443_CBL.TXT |
| 01/29/01 12:34p | 22,786 | LCIS444_CBL.TXT |
| 01/29/01 12:34p | 27,668 | LCIS445_CBL.TXT |
| 01/29/01 12:34p | 29,873 | LCIS449_CBL.TXT |
| 01/29/01 12:34p | 76,689 | LCIS451_CBL.TXT |
| 01/29/01 10:46a | 317 | LCIS451_CPY.TXT |
| 01/29/01 12:34p | 55,568 | LCIS452_CBL.TXT |
| 01/29/01 10:46a | 317 | LCIS452_CPY.TXT |
| 01/29/01 12:35p | 54,293 | LCIS455_CBL.TXT |
| 01/29/01 10:46a | 317 | LCIS455_CPY.TXT |
| 01/29/01 12:35p | 66,733 | LCIS460_CBL.TXT |
| 01/29/01 12:35p | 37,261 | LCIS462_CBL.TXT |
| 01/29/01 12:35p | 99,936 | LCIS463_CBL.TXT |
| 01/29/01 04:01p | 104,294 | RCIS100m.TXT |
| 01/29/01 04:02p | 84,216 | RCIS101m.TXT |
| 01/29/01 04:02p | 87,439 | RCIS102m.TXT |
| 01/29/01 04:26p | 92,074 | RCIS103m.TXT |
| 01/29/01 04:26p | 83,317 | RCIS104m.TXT |
| 01/29/01 04:26p | 92,933 | RCIS106m.TXT |
| 01/29/01 04:26p | 83,164 | RCIS111m.TXT |
| 01/29/01 04:34p | 61,274 | RCIS112m.TXT |
| 01/29/01 04:26p | 89,756 | RCIS140m.TXT |
| 01/29/01 04:26p | 70,581 | RCIS141m.TXT |
| 01/29/01 04:26p | 112,220 | RCIS142m.TXT |
| 01/29/01 04:27p | 69,415 | RCIS143m.TXT |
| 01/29/01 04:34p | 85,294 | RCIS190m.TXT |
| 01/29/01 04:34p | 87,768 | RCIS191m.TXT |
| 01/29/01 04:34p | 102,190 | RCIS192m.TXT |
| 01/29/01 04:34p | 105,248 | RCIS193m.TXT |
| 01/29/01 04:34p | 85,497 | RCIS194m.TXT |
| 01/29/01 04:34p | 107,615 | RCIS196m.TXT |
| 01/29/01 04:34p | 99,720 | RCIS199m.TXT |
| 01/29/01 04:28p | 99,722 | RCIS701m.TXT |
| 01/29/01 04:34p | 115,070 | RCIS702m.TXT |
| 01/29/01 04:29p | 85,799 | RCIS703m.TXT |
| 01/29/01 04:34p | 104,168 | RCIS704m.TXT |
| 01/29/01 04:29p | 85,717 | RCIS705m.TXT |
| 01/29/01 04:34p | 93,370 | RCIS706m.TXT |
| 01/29/01 04:29p | 88,711 | RCIS707m.TXT |
| 01/29/01 04:34p | 101,296 | RCIS708m.TXT |
| 01/29/01 04:29p | 97,929 | RCIS709m.TXT |
| 01/29/01 04:34p | 108,786 | RCIS710m.TXT |
| 01/29/01 04:29p | 91,554 | RCIS711m.TXT |
| 01/29/01 04:34p | 107,841 | RCIS712m.TXT |
| 01/29/01 04:29p | 95,314 | RCIS713m.TXT |
| 01/29/01 04:34p | 116,846 | RCIS714m.TXT |
| 01/29/01 04:29p | 82,667 | RCIS717m.TXT |
| 01/29/01 04:34p | 105,771 | RCIS718m.TXT |
| 01/29/01 04:31p | 125,556 | RCIS723m.TXT |
| 01/29/01 04:34p | 118,032 | RCIS724m.TXT |
| 01/29/01 04:31p | 86,801 | RCIS727m.TXT |
| 01/29/01 04:34p | 111,967 | RCIS728m.TXT |
| 01/29/01 04:31p | 117,336 | RCIS729m.TXT |
| 01/29/01 04:34p | 109,443 | RCIS730m.TXT |
| 01/29/01 04:30p | 86,482 | RCIS731m.TXT |
| 01/29/01 04:34p | 105,040 | RCIS732m.TXT |
| 01/29/01 04:34p | 97,329 | RCIS999m.TXT |
| 01/29/01 10:39a | 144,095 | SCIS100_CBL.TXT |
| 01/29/01 10:53a | 343 | SCIS100_CPY.TXT |
| 01/29/01 10:39a | 91,151 | SCIS101_CBL.TXT |
| 01/29/01 10:54a | 343 | SCIS101_CPY.TXT |
| 01/29/01 10:39a | 90,179 | SCIS102_CBL.TXT |
| 01/29/01 10:54a | 349 | SCIS102_CPY.TXT |
| 01/29/01 10:39a | 124,449 | SCIS103_CBL.TXT |
| 01/29/01 10:54a | 349 | SCIS103_CPY.TXT |

-continued

| | | |
|---|---:|---|
| 01/29/01 10:39a | 84,119 | SCIS104_CBL.TXT |
| 01/29/01 10:54a | 340 | SCIS104_CPY.TXT |
| 01/29/01 10:39a | 140,052 | SCIS106_CBL.TXT |
| 01/29/01 10:54a | 346 | SCIS106_CPY.TXT |
| 01/29/01 10:39a | 84,012 | SCIS111_CBL.TXT |
| 01/29/01 10:54a | 337 | SCIS111_CPY.TXT |
| 01/29/01 12:35p | 92,662 | SCIS112_CBL.TXT |
| 01/29/01 10:39a | 101,417 | SCIS140_CBL.TXT |
| 01/29/01 10:54a | 343 | SCIS140_CPY.TXT |
| 01/29/01 10:39a | 74,035 | SCIS141_CBL.TXT |
| 01/29/01 10:39a | 299,844 | SCIS142_CBL.TXT |
| 01/29/01 10:54a | 346 | SCIS142_CPY.TXT |
| 01/29/01 12:41p | 87,824 | SCIS143_CBL.TXT |
| 01/29/01 10:39a | 118,965 | SCIS190_CBL.TXT |
| 01/29/01 10:39a | 126,028 | SCIS191_CBL.TXT |
| 01/29/01 10:39a | 140,902 | SCIS192_CBL.TXT |
| 01/29/01 10:39a | 136,390 | SCIS193_CBL.TXT |
| 01/29/01 10:39a | 118,178 | SCIS194_CBL.TXT |
| 01/29/01 10:39a | 146,211 | SCIS196_CBL.TXT |
| 01/29/01 10:39a | 124,426 | SCIS199_CBL.TXT |
| 01/29/01 10:39a | 169,468 | SCIS701_CBL.TXT |
| 01/29/01 10:55a | 346 | SCIS701_CPY.TXT |
| 01/29/01 10:39a | 139,090 | SCIS702_CBL.TXT |
| 01/29/01 10:40a | 88,998 | SCIS703_CBL.TXT |
| 01/29/01 10:55a | 346 | SCIS703_CPY.TXT |
| 01/29/01 10:40a | 134,605 | SCIS704_CBL.TXT |
| 01/29/01 10:40a | 104,320 | SCIS705_CBL.TXT |
| 01/29/01 10:55a | 349 | SCIS705_CPY.TXT |
| 01/29/01 10:40a | 124,457 | SCIS706_CBL.TXT |
| 01/29/01 10:40a | 91,408 | SCIS707_CBL.TXT |
| 01/29/01 10:55a | 349 | SCIS707_CPY.TXT |
| 01/29/01 10:40a | 125,202 | SCIS708_CBL.TXT |
| 01/29/01 10:40a | 116,165 | SCIS709_CBL.TXT |
| 01/29/01 10:55a | 343 | SCIS709_CPY.TXT |
| 01/29/01 10:40a | 148,219 | SCIS710_CBL.TXT |
| 01/29/01 10:40a | 93,778 | SCIS711_CBL.TXT |
| 01/29/01 10:55a | 346 | SCIS711_CPY.TXT |
| 01/29/01 10:40a | 126,338 | SCIS712_CBL.TXT |
| 01/29/01 10:40a | 214,783 | SCIS713_CBL.TXT |
| 01/29/01 10:55a | 675 | SCIS713_CPY.TXT |
| 01/29/01 10:40a | 136,369 | SCIS714_CBL.TXT |
| 01/29/01 10:40a | 84,799 | SCIS717_CBL.TXT |
| 01/29/01 10:56a | 349 | SCIS717_CPY.TXT |
| 01/29/01 10:40a | 127,780 | SCIS718_CBL.TXT |
| 01/29/01 10:40a | 468,380 | SCIS723_CBL.TXT |
| 01/29/01 10:40a | 349 | SCIS723_CPY.TXT |
| 01/29/01 10:40a | 186,159 | SCIS724_CBL.TXT |
| 01/29/01 10:40a | 238,079 | SCIS727_CBL.TXT |
| 01/29/01 10:56a | 349 | SCIS727_CPY.TXT |
| 01/29/01 10:40a | 128,803 | SCIS728_CBL.TXT |
| 01/29/01 10:40a | 436,585 | SCIS729_CBL.TXT |
| 01/29/01 10:56a | 346 | SCIS729_CPY.TXT |
| 01/29/01 10:40a | 175,547 | SCIS730_CBL.TXT |
| 01/29/01 10:40a | 86,311 | SCIS731_CBL.TXT |
| 01/29/01 10:57a | 349 | SCIS731_CPY.TXT |
| 01/29/01 10:40a | 127,420 | SCIS732_CBL.TXT |
| 01/29/01 10:40a | 144,640 | SCIS999_CBL.TXT |
| Directory of D:\M-9381 US\COR | | |
| 01/31/01 03:27p | <DIR> | . |
| 01/31/01 03:31p | <DIR> | .. |
| 01/29/01 10:41a | 16,105 | BCOR001_CBL.TXT |
| 01/29/01 10:41a | 16,691 | BCOR002_CBL.TXT |
| 01/29/01 12:29p | 68,108 | BCOR003_CBL.TXT |
| 01/29/01 10:39a | 25,942 | ICOR001_CBL.TXT |
| 01/29/01 10:52a | 8,372 | ICOR001_CPY.TXT |
| 01/29/01 10:39a | 43,927 | ICOR011_CBL.TXT |
| 01/29/01 10:52a | 26,969 | ICOR011_CPY.TXT |
| 01/29/01 10:39a | 38,679 | ICOR012_CBL.TXT |
| 01/29/01 10:52a | 22,122 | ICOR012_CPY.TXT |
| 01/29/01 10:39a | 40,805 | ICOR013_CBL.TXT |
| 01/29/01 10:52a | 24,879 | ICOR013_CPY.TXT |
| 01/29/01 10:39a | 41,479 | ICOR016_CBL.TXT |
| 01/29/01 10:52a | 28,351 | ICOR016_CPY.TXT |
| 01/29/01 10:39a | 41,295 | ICOR017_CBL.TXT |
| 01/29/01 10:52a | 27,875 | ICOR017_CPY.TXT |
| 01/29/01 10:39a | 47,559 | ICOR019_CBL.TXT |
| 01/29/01 10:53a | 29,279 | ICOR019_CPY.TXT |
| 01/29/01 10:39a | 41,090 | ICOR020_CBL.TXT |
| 01/29/01 10:53a | 27,139 | ICOR020_CPY.TXT |
| 01/29/01 10:39a | 42,011 | ICOR021_CBL.TXT |

-continued

| | | |
|---|---:|---|
| 01/29/01 10:53a | 29,334 | ICOR021_CPY.TXT |
| 01/29/01 12:35p | 30,078 | ICOR022_CBL.TXT |
| 01/29/01 10:53a | 8,651 | ICOR022_CPY.TXT |
| 01/29/01 10:39a | 37,393 | ICOR023_CBL.TXT |
| 01/29/01 10:53a | 21,514 | ICOR023_CPY.TXT |
| 01/29/01 10:39a | 64,580 | ICOR025_CBL.TXT |
| 01/29/01 10:53a | 46,243 | ICOR025_CPY.TXT |
| 01/29/01 10:39a | 42,068 | ICOR028_CBL.TXT |
| 01/29/01 10:53a | 29,929 | ICOR028_CPY.TXT |
| 01/29/01 10:39a | 56,659 | ICOR050_CBL.TXT |
| 01/29/01 10:53a | 38,833 | ICOR050_CPY.TXT |
| 01/29/01 10:39a | 54,144 | ICOR051_CBL.TXT |
| 01/29/01 10:53a | 36,342 | ICOR051_CPY.TXT |
| 01/29/01 10:39a | 49,390 | ICOR052_CBL.TXT |
| 01/29/01 10:53a | 32,346 | ICOR052_CPY.TXT |
| 01/29/01 10:39a | 61,073 | ICOR053_CBL.TXT |
| 01/29/01 10:53a | 42,464 | ICOR053_CPY.TXT |
| 01/29/01 10:39a | 49,137 | ICOR054_CBL.TXT |
| 01/29/01 10:53a | 32,156 | ICOR054_CPY.TXT |
| 01/29/01 10:39a | 57,354 | ICOR055_CBL.TXT |
| 01/29/01 10:53a | 39,006 | ICOR055_CPY.TXT |
| 01/29/01 10:39a | 70,700 | ICOR056_CBL.TXT |
| 01/29/01 10:53a | 50,684 | ICOR056_CPY.TXT |
| 01/29/01 10:39a | 49,283 | ICOR057_CBL.TXT |
| 01/29/01 10:53a | 32,345 | ICOR057_CPY.TXT |
| 01/29/01 10:39a | 67,585 | ICOR058_CBL.TXT |
| 01/29/01 10:53a | 48,403 | ICOR058_CPY.TXT |
| 01/29/01 10:39a | 68,072 | ICOR059_CBL.TXT |
| 01/29/01 10:53a | 47,277 | ICOR059_CPY.TXT |
| 01/29/01 12:41p | 79,984 | LCOR001_CBL.TXT |
| 01/29/01 10:46a | 323 | LCOR001_CPY.TXT |
| 01/29/01 12:35p | 27,847 | LCOR002_CBL.TXT |
| 01/29/01 12:36p | 29,319 | LCOR003_CBL.TXT |
| 01/29/01 12:36p | 33,886 | LCOR004_CBL.TXT |
| 01/29/01 12:36p | 28,433 | LCOR005_CBL.TXT |
| 01/29/01 01:35p | 26,328 | LCOR006_CBL.TXT |
| 01/29/01 12:36p | 23,979 | LCOR007_CBL.TXT |
| 01/29/01 12:42p | 27,505 | LCOR010_CBL.TXT |
| 01/29/01 04:30p | 57,676 | RCOR000m.TXT |
| 01/29/01 04:30p | 53,152 | RCOR001m.TXT |
| 01/29/01 04:34p | 57,916 | RCOR002m.TXT |
| 01/29/01 04:34p | 53,337 | RCOR007m.TXT |
| 01/29/01 04:30p | 92,054 | RCOR011m.TXT |
| 01/29/01 04:30p | 86,881 | RCOR012m.TXT |
| 01/29/01 04:30p | 86,596 | RCOR013m.TXT |
| 01/29/01 04:30p | 82,400 | RCOR016m.TXT |
| 01/29/01 04:30p | 83,438 | RCOR017m.TXT |
| 01/29/01 04:30p | 59,213 | RCOR018m.TXT |
| 01/29/01 04:30p | 100,528 | RCOR019m.TXT |
| 01/29/01 04:30p | 84,268 | RCOR020m.TXT |
| 01/29/01 04:30p | 81,747 | RCOR021m.TXT |
| 01/29/01 04:30p | 81,903 | RCOR023m.TXT |
| 01/29/01 04:35p | 98,146 | RCOR025m.TXT |
| 01/29/01 04:30p | 81,155 | RCOR028m.TXT |
| 01/29/01 04:30p | 46,097 | RCOR033m.TXT |
| 01/29/01 04:35p | 91,065 | RCOR050m.TXT |
| 01/29/01 04:35p | 87,584 | RCOR051m.TXT |
| 01/29/01 04:35p | 80,488 | RCOR052m.TXT |
| 01/29/01 04:35p | 96,711 | RCOR053m.TXT |
| 01/29/01 04:35p | 81,410 | RCOR054m.TXT |
| 01/29/01 04:35p | 92,375 | RCOR055m.TXT |
| 01/29/01 04:35p | 102,448 | RCOR056m.TXT |
| 01/29/01 04:35p | 81,376 | RCOR057m.TXT |
| 01/29/01 04:35p | 104,131 | RCOR058m.TXT |
| 01/29/01 04:35p | 104,784 | RCOR059m.TXT |
| 01/29/01 12:42p | 93,661 | SCOR000_CBL.TXT |
| 01/29/01 10:57a | 348 | SCOR000_CPY.TXT |
| 01/29/01 12:36p | 86,049 | SCOR001_CBL.TXT |
| 01/29/01 10:57a | 348 | SCOR001_CPY.TXT |
| 01/29/01 10:40a | 53,682 | SCOR007_CBL.TXT |
| 01/29/01 10:40a | 124,142 | SCOR011_CBL.TXT |
| 01/29/01 10:57a | 349 | SCOR011_CPY.TXT |
| 01/29/01 10:40a | 87,161 | SCOR012_CBL.TXT |
| 01/29/01 10:57a | 343 | SCOR012_CPY.TXT |
| 01/29/01 10:40a | 123,301 | SCOR013_CBL.TXT |
| 01/29/01 10:57a | 674 | SCOR013_CPY.TXT |
| 01/29/01 10:40a | 81,407 | SCOR016_CBL.TXT |
| 01/29/01 10:57a | 349 | SCOR016_CPY.TXT |
| 01/29/01 10:40a | 80,331 | SCOR017_CBL.TXT |
| 01/29/01 10:57a | 349 | SCOR017_CPY.TXT |
| 01/29/01 12:36p | 96,171 | SCOR018_CBL.TXT |
| 01/29/01 10:41a | 154,792 | SCOR019_CBL.TXT |
| 01/29/01 10:57a | 346 | SCOR019_CPY.TXT |
| 01/29/01 10:41a | 81,191 | SCOR020_CBL.TXT |
| 01/29/01 10:57a | 346 | SCOR020_CPY.TXT |
| 01/29/01 10:41a | 76,854 | SCOR021_CBL.TXT |
| 01/29/01 10:57a | 346 | SCOR021_CPY.TXT |
| 01/29/01 10:41a | 62,279 | SCOR022_CBL.TXT |
| 01/29/01 10:41a | 82,063 | SCOR023_CBL.TXT |
| 01/29/01 10:57a | 340 | SCOR023_CPY.TXT |
| 01/29/01 12:36p | 49,752 | SCOR024_CBL.TXT |
| 01/29/01 10:57a | 348 | SCOR024_CPY.TXT |
| 01/29/01 10:41a | 126,300 | SCOR025_CBL.TXT |
| 01/29/01 10:41a | 75,975 | SCOR028_CBL.TXT |
| 01/29/01 10:58a | 349 | SCOR028_CPY.TXT |
| 01/29/01 10:41a | 47,512 | SCOR029_CBL.TXT |
| 01/29/01 12:36p | 47,734 | SCOR033_CBL.TXT |
| 01/29/01 10:41a | 120,091 | SCOR050_CBL.TXT |
| 01/29/01 10:41a | 118,238 | SCOR051_CBL.TXT |
| 01/29/01 10:41a | 194,847 | SCOR052_CBL.TXT |
| 01/29/01 10:41a | 249,802 | SCOR053_CBL.TXT |
| 01/29/01 10:41a | 113,857 | SCOR054_CBL.TXT |
| 01/29/01 10:41a | 122,912 | SCOR055_CBL.TXT |
| 01/29/01 10:41a | 144,769 | SCOR056_CBL.TXT |
| 01/29/01 10:41a | 145,415 | SCOR057_CBL.TXT |
| 01/29/01 10:41a | 154,295 | SCOR058_CBL.TXT |
| 01/29/01 10:41a | 128,384 | SCOR059_CBL.TXT |
| 01/29/01 10:41a | 18,359 | SCOR099_CBL.TXT |
| Directory of D:\M-9381 US\LIB | | |
| 01/31/01 03:27p | <DIR> | . |
| 01/31/01 03:31p | <DIR> | .. |
| 02/13/96 12:46p | 514 | CPY001_CPY.TXT |
| 11/23/00 04:59p | 270 | CPY000_CPY.TXT |
| 01/29/01 04:51p | 3,444 | CPY002_CPY.TXT |
| 01/29/01 04:51p | 5,685 | CPY003_CPY.TXT |
| 09/30/98 04:02p | 4,059 | CPY004_CPY.TXT |
| 09/30/98 03:43p | 4,799 | CPY005_CPY.TXT |
| 10/06/00 02:21p | 10,347 | Libcdecb_CPY.TXT |
| 01/12/01 04:05p | 16,444 | cpyinv_CPY.TXT |
| 01/12/01 04:05p | 786,094 | libmsgcb_CPY.TXT |
| 01/12/01 04:05p | 61,640 | libreccb_CPY.TXT |
| 01/12/01 04:05p | 54,510 | libwstcb_CPY.TXT |
| Directory of D:\M-9381 US\LXN | | |
| 01/31/01 03:27p | <DIR> | . |
| 01/31/01 03:31p | <DIR> | .. |
| 01/29/01 10:37a | 46,085 | LX0A463_CBL.TXT |
| 01/29/01 10:37a | 150,845 | LX1A305_CBL.TXT |
| 01/29/01 10:37a | 150,845 | LX1A309_CBL.TXT |
| 01/29/01 10:37a | 127,563 | LX1E029_CBL.TXT |
| 01/29/01 10:37a | 127,917 | LX1E401_CBL.TXT |
| 01/29/01 10:37a | 138,405 | LX1E404_CBL.TXT |
| 01/29/01 10:37a | 56,995 | LX1E405_CBL.TXT |
| 01/29/01 10:37a | 137,114 | LX1E406_CBL.TXT |
| 01/29/01 10:37a | 24,698 | LX1E407_CBL.TXT |
| 01/29/01 10:37a | 269,840 | LX1E411_CBL.TXT |
| 01/29/01 10:37a | 33,630 | LX1E440_CBL.TXT |
| 01/29/01 10:37a | 48,859 | LX1E441_CBL.TXT |
| 01/29/01 10:38a | 36,024 | LX1E442_CBL.TXT |
| 01/29/01 10:38a | 36,868 | LX1E443_CBL.TXT |
| 01/29/01 10:38a | 23,375 | LX1E444_CBL.TXT |
| 01/29/01 10:38a | 165,404 | LX1E445_CBL.TXT |
| 01/29/01 10:38a | 35,602 | LX1E463_CBL.TXT |
| 01/29/01 10:38a | 45,930 | LX1R404_CBL.TXT |
| 01/29/01 10:38a | 23,260 | LX1R409_CBL.TXT |
| 01/29/01 10:38a | 43,432 | LX1R445_CBL.TXT |
| 01/29/01 10:38a | 21,443 | LX2A305_CBL.TXT |
| 01/29/01 10:38a | 21,443 | LX2A309_CBL.TXT |
| 01/29/01 10:38a | 81,672 | LX2E029_CBL.TXT |
| 01/29/01 10:38a | 81,527 | LX2E401_CBL.TXT |
| 01/29/01 10:38a | 97,096 | LX2E404_CBL.TXT |
| 01/29/01 10:38a | 38,786 | LX2E405_CBL.TXT |
| 01/29/01 10:38a | 89,480 | LX2E406_CBL.TXT |
| 01/29/01 10:38a | 24,608 | LX2E407_CBL.TXT |
| 01/29/01 10:38a | 165,091 | LX2E411_CBL.TXT |
| 01/29/01 10:38a | 24,187 | LX2E440_CBL.TXT |
| 01/29/01 10:38a | 73,667 | LX2E441_CBL.TXT |
| 01/29/01 10:38a | 27,125 | LX2E442_CBL.TXT |
| 01/29/01 10:38a | 26,856 | LX2E443_CBL.TXT |
| 01/29/01 10:38a | 20,100 | LX2E444_CBL.TXT |
| 01/29/01 10:38a | 110,268 | LX2E445_CBL.TXT |

-continued

| | | |
|---|---:|---|
| 01/29/01 10:38a | 26,421 | LX2E463_CBL.TXT |
| 01/29/01 10:38a | 22,323 | LX3A305_CBL.TXT |
| 01/29/01 10:38a | 22,323 | LX3A309_CBL.TXT |
| 01/29/01 10:38a | 29,944 | LX4A305_CBL.TXT |
| 01/29/01 10:38a | 29,944 | LX4A309_CBL.TXT |
| 01/29/01 10:38a | 19,684 | LX5A305_CBL.TXT |
| 01/29/01 10:38a | 19,684 | LX5A309_CBL.TXT |
| Directory of D:\M-9381 US\MFS | | |
| 01/31/01 03:28p | <DIR> | . |
| 01/31/01 03:31p | <DIR> | .. |
| 01/29/01 10:41a | 222 | ZABEND1_CBL.TXT |
| 01/29/01 10:41a | 6,631 | ZCALLSV_CBL.TXT |
| 01/29/01 10:41a | 1,077 | ZCBLERR_CBL.TXT |
| 01/29/01 10:41a | 4,857 | ZCONECT_CBL.TXT |
| 01/29/01 10:41a | 5,291 | ZCRERPT_CBL.TXT |
| 01/29/01 10:41a | 276 | ZDEBUG1_CBL.TXT |
| 01/29/01 10:41a | 393 | ZDEBUG2_CBL.TXT |
| 01/29/01 10:41a | 1,728 | ZDISCON_CBL.TXT |
| 01/29/01 10:41a | 1,041 | ZGETTXT_CBL.TXT |
| 01/29/01 10:41a | 6,932 | ZINIINP_CBL.TXT |
| 01/29/01 10:41a | 891 | ZINTJUL_CBL.TXT |
| 01/29/01 10:41a | 2,153 | ZINTTME_CBL.TXT |
| 01/29/01 10:41a | 829 | ZJULDAY_CBL.TXT |
| 01/29/01 10:41a | 624 | ZJULDYN_CBL.TXT |
| 01/29/01 10:41a | 1,479 | ZJULSTM_CBL.TXT |
| 01/29/01 10:41a | 1,562 | ZJULTME_CBL.TXT |
| 01/29/01 10:41a | 5,953 | ZLEVENT_CBL.TXT |
| 01/29/01 10:41a | 698 | ZOLE001_CBL.TXT |
| 01/29/01 10:41a | 1,691 | ZOLE002_CBL.TXT |
| 01/29/01 10:41a | 696 | ZOLE100_CBL.TXT |
| 01/29/01 10:41a | 696 | ZOLE101_CBL.TXT |
| 01/29/01 10:41a | 696 | ZOLE102_CBL.TXT |
| 01/29/01 10:41a | 696 | ZOLE103_CBL.TXT |
| 01/29/01 10:41a | 696 | ZOLE104_CBL.TXT |
| 01/29/01 10:41a | 696 | ZOLE105_CBL.TXT |
| 01/29/01 10:41a | 696 | ZOLE106_CBL.TXT |
| 01/29/01 10:41a | 696 | ZOLE107_CBL.TXT |
| 01/29/01 10:41a | 696 | ZOLE108_CBL.TXT |
| 01/29/01 10:41a | 696 | ZOLE109_CBL.TXT |
| 01/29/01 10:41a | 133,143 | ZPREPRC_CBL.TXT |
| 01/29/01 10:41a | 1,772 | ZSQLERR_CBL.TXT |
| 01/29/01 10:41a | 1,198 | ZTIME01_CBL.TXT |
| 01/29/01 10:41a | 1,769 | ZTJULDY_CBL.TXT |
| 01/29/01 10:41a | 2,111 | ZTMFTRN_CBL.TXT |
| 01/29/01 10:41a | 1,090 | ZTRG001_CBL.TXT |
| 01/29/01 10:41a | 492 | ZTRG002_CBL.TXT |
| Directory of D:\M-9381 US\MSC | | |
| 01/31/01 03:30p | <DIR> | . |
| 01/31/01 03:31p | <DIR> | .. |
| 01/29/01 12:25p | 53,642 | BMSC201_CBL.TXT |
| 01/29/01 12:25p | 130,025 | BMSC230_CBL.TXT |
| 01/29/01 10:59a | 977 | BMSC230_CPY.TXT |
| 01/29/01 12:25p | 133,301 | BMSC262_CBL.TXT |
| 01/29/01 10:59a | 982 | BMSC262_CPY.TXT |
| 01/29/01 01:35p | 113,486 | BMSC263_CBL.TXT |
| 01/29/01 10:59a | 330 | BMSC263_CPY.TXT |
| 01/29/01 12:25p | 154,552 | BMSC267_CBL.TXT |
| 01/29/01 10:59a | 1,308 | BMSC267_CPY.TXT |
| 01/29/01 12:25p | 134,918 | BMSC275_CBL.TXT |
| 01/29/01 10:59a | 977 | BMSC275_CPY.TXT |
| 01/29/01 12:26p | 153,076 | BMSC276_CBL.TXT |
| 01/29/01 10:59a | 1,305 | BMSC276_CPY.TXT |
| 01/29/01 12:26p | 106,890 | BMSC300_CBL.TXT |
| 01/29/01 11:00a | 330 | BMSC300_CPY.TXT |
| 01/29/01 12:26p | 104,861 | BMSC301_CBL.TXT |
| 01/29/01 11:00a | 330 | BMSC301_CPY.TXT |
| 01/29/01 12:37p | 171,201 | BMSC350_CBL.TXT |
| 01/29/01 11:00a | 330 | BMSC350_CPY.TXT |
| 01/29/01 12:26p | 128,125 | BMSC351_CBL.TXT |
| 01/29/01 11:00a | 330 | BMSC351_CPY.TXT |
| 01/29/01 12:26p | 132,623 | BMSC352_CBL.TXT |
| 01/29/01 11:00a | 979 | BMSC352_CPY.TXT |
| 01/29/01 12:26p | 375,914 | BMSC359_CBL.TXT |
| 01/29/01 11:00a | 2,271 | BMSC359_CPY.TXT |
| 01/29/01 12:43p | 171,267 | BMSC360_CBL.TXT |
| 01/29/01 11:00a | 330 | BMSC360_CPY.TXT |
| 01/29/01 12:43p | 143,913 | BMSC370_CBL.TXT |
| 01/29/01 11:00a | 330 | BMSC370_CPY.TXT |
| 01/29/01 12:27p | 130,614 | BMSC373_CBL.TXT |
| 01/29/01 11:00a | 330 | BMSC373_CPY.TXT |
| 01/29/01 12:27p | 109,484 | BMSC375_CBL.TXT |
| 01/29/01 11:00a | 330 | BMSC375_CPY.TXT |
| 01/29/01 12:27p | 109,876 | BMSC376_CBL.TXT |
| 01/29/01 11:00a | 330 | BMSC376_CPY.TXT |
| 01/29/01 12:27p | 131,522 | BMSC382_CBL.TXT |
| 01/29/01 11:00a | 330 | BMSC382_CPY.TXT |
| 01/29/01 12:27p | 134,514 | BMSC383_CBL.TXT |
| 01/29/01 11:00a | 330 | BMSC383_CPY.TXT |
| 01/29/01 12:27p | 124,580 | BMSC385_CBL.TXT |
| 01/29/01 11:00a | 1,300 | BMSC385_CPY.TXT |
| 01/29/01 12:27p | 124,591 | BMSC394_CBL.TXT |
| 01/29/01 11:00a | 330 | BMSC394_CPY.TXT |
| 01/29/01 12:15p | 130,966 | BMSC398_CBL.TXT |
| 01/29/01 11:00a | 330 | BMSC398_CPY.TXT |
| 01/29/01 12:44p | 124,467 | BMSC518_CBL.TXT |
| 01/29/01 11:00a | 330 | BMSC518_CPY.TXT |
| 01/29/01 12:44p | 111,287 | BMSC592_CBL.TXT |
| 01/29/01 11:00a | 330 | BMSC592_CPY.TXT |
| 01/29/01 12:44p | 193,976 | BMSC602_CBL.TXT |
| 01/29/01 11:00a | 1,302 | BMSC602_CPY.TXT |
| 01/29/01 12:44p | 130,254 | BMSC603_CBL.TXT |
| 01/29/01 11:00a | 330 | BMSC603_CPY.TXT |
| 01/29/01 12:14p | 138,846 | BMSC604_CBL.TXT |
| 01/29/01 11:01a | 330 | BMSC604_CPY.TXT |
| 01/29/01 12:28p | 117,263 | BMSC605_CBL.TXT |
| 01/29/01 11:01a | 330 | BMSC605_CPY.TXT |
| 01/29/01 12:27p | 328,668 | BMSC606_CBL.TXT |
| 01/29/01 11:01a | 330 | BMSC606_CPY.TXT |
| 01/29/01 12:15p | 101,418 | BMSC607_CBL.TXT |
| 01/29/01 11:01a | 330 | BMSC607_CPY.TXT |
| 01/29/01 10:39a | 73,803 | IMSC301_CBL.TXT |
| 01/29/01 10:53a | 46,777 | IMSC301_CPY.TXT |
| 01/29/01 10:39a | 23,449 | IMSC302_CBL.TXT |
| 01/29/01 10:53a | 8,159 | IMSC302_CPY.TXT |
| 01/29/01 10:39a | 30,221 | IMSC303_CBL.TXT |
| 01/29/01 10:53a | 14,128 | IMSC303_CPY.TXT |
| 01/29/01 10:39a | 62,937 | IMSC304_CBL.TXT |
| 01/29/01 10:53a | 40,417 | IMSC304_CPY.TXT |
| 01/29/01 10:39a | 35,204 | IMSC305_CBL.TXT |
| 01/29/01 10:53a | 18,042 | IMSC305_CPY.TXT |
| 01/29/01 10:39a | 42,240 | IMSC306_CBL.TXT |
| 01/29/01 10:53a | 27,845 | IMSC306_CPY.TXT |
| 01/29/01 10:39a | 54,964 | IMSC308_CBL.TXT |
| 01/29/01 10:53a | 36,148 | IMSC308_CPY.TXT |
| 01/29/01 10:39a | 61,996 | IMSC310_CBL.TXT |
| 01/29/01 10:53a | 40,517 | IMSC310_CPY.TXT |
| 01/29/01 04:44p | 359,347 | LMSC305_CBL.TXT |
| 01/29/01 04:44p | 359,429 | LMSC309_CBL.TXT |
| 01/29/01 04:52p | 210,026 | LMSC350_CBL.TXT |
| 01/29/01 12:46p | 114,054 | LMSC351_CBL.TXT |
| 01/29/01 10:47a | 2,610 | LMSC351_CPY.TXT |
| 01/29/01 01:37p | 101,195 | LMSC360_CBL.TXT |
| 01/29/01 12:37p | 168,284 | LMSC600_CBL.TXT |
| 01/29/01 04:44p | 23,909 | LMSC602_CBL.TXT |
| 01/29/01 12:37p | 28,016 | LMSC603_CBL.TXT |
| 01/29/01 12:38p | 33,163 | LMSC604_CBL.TXT |
| 01/29/01 12:38p | 22,464 | LMSC605_CBL.TXT |
| 01/29/01 12:38p | 21,301 | LMSC606_CBL.TXT |
| 01/29/01 12:38p | 144,338 | LMSC607_CBL.TXT |
| 01/29/01 04:44p | 111,911 | RMSC301m.TXT |
| 01/29/01 04:44p | 47,627 | RMSC302m.TXT |
| 01/29/01 04:44p | 65,115 | RMSC303m.TXT |
| 01/29/01 04:44p | 88,736 | RMSC304m.TXT |
| 01/29/01 04:35p | 59,224 | RMSC305m.TXT |
| 01/29/01 04:44p | 68,814 | RMSC306m.TXT |
| 01/29/01 04:44p | 97,072 | RMSC308m.TXT |
| 01/29/01 12:38p | 223,681 | SMSC301_CBL.TXT |
| 01/29/01 10:58a | 675 | SMSC301_CPY.TXT |
| 01/29/01 12:38p | 89,057 | SMSC302_CBL.TXT |
| 01/29/01 10:58a | 675 | SMSC302_CPY.TXT |
| 01/29/01 04:44p | 129,411 | SMSC303_CBL.TXT |
| 01/29/01 12:38p | 250,088 | SMSC304_CBL.TXT |
| 01/29/01 10:59a | 672 | SMSC304_CPY.TXT |
| 01/29/01 04:44p | 57,109 | SMSC305_CBL.TXT |
| 01/29/01 12:38p | 197,292 | SMSC306_CBL.TXT |
| 01/29/01 12:38p | 284,622 | SMSC308_CBL.TXT |
| 01/29/01 10:59a | 1,641 | SMSC308_CPY.TXT |
| 01/29/01 04:44p | 57,109 | SMSC309_CBL.TXT |
| 01/29/01 12:38p | 147,371 | SMSC310_CBL.TXT |
| 01/29/01 10:59a | 996 | SMSC310_CPY.TXT |

-continued

```
Directory of D:\M-9381 US\SCRIPTS
01/31/01 03:30p    <DIR>         .
01/31/01 03:31p    <DIR>         ..
11/28/00 11:44a       14,383     Fstdev_SCP.TXT
01/29/01 10:35a      275,599     LNT_DEMO_SCP.TXT
01/29/01 10:35a       83,059     LNT_OPS_SCP.TXT
01/29/01 10:35a       67,790     LNT_USER_SCP.TXT
01/29/01 10:35a      149,283     Lnt_advanced_SCP.TXT
01/29/01 10:35a      280,531     Lnt_regntest_SCP.TXT
01/29/01 10:35a       46,957     Lnt_security_SCP.TXT
01/29/01 10:35a      285,104     Lnt_super_SCP.TXT
01/29/01 10:35a       15,897     NSK_OPS_SCP.TXT
01/29/01 10:35a        9,682     NSK_USER_SCP.TXT
01/29/01 10:35a       35,944     Nsk_advanced_SCP.TXT
01/29/01 10:35a       53,921     Nsk_regntest_SCP.TXT
01/29/01 10:35a        4,024     Nsk_security_SCP.TXT
01/29/01 10:35a       56,196     Nsk_super_SCP.TXT
10/24/00 08:24a       43,345     Pccase_SCP.TXT
01/29/01 10:35a       85,214     RNT_OPS_SCP.TXT
01/29/01 10:35a       69,866     RNT_USER_SCP.TXT
01/29/01 10:35a      151,510     Rnt_advanced_SCP.TXT
01/29/01 10:35a      282,853     Rnt_regntest_SCP.TXT
01/29/01 10:35a       49,010     Rnt_security_SCP.TXT
01/29/01 10:35a      287,425     Rnt_super_SCP.TXT
Directory of D:\M-9381 US\SQL
01/31/01 03:31p    <DIR>         .
01/31/01 03:31p    <DIR>         ..
11/24/00 06:24p        3,616     Currency_Ref_Integ_Check_Execs__
                                 sql.txt
05/13/99 05:12p          993     Relate_Markets_To_Std_PriceHdrs__
                                 sql.txt
05/13/99 02:38p        2,297     Service_Ref_Integ_Check_Execs__
                                 sql.txt
12/22/00 10:18a      114,758     create_all_procs_sql.txt
01/11/01 03:57p      302,536     create_all_tables_sql.txt
Directory of D:\M-9381 US\WEBAPP
01/31/01 03:35p    <DIR>         .
01/31/01 03:31p    <DIR>         ..
01/31/01 03:33p    <DIR>         FUNCS
04/30/99 05:38p        1,582     Fstgwy_asp.txt
01/31/01 03:33p    <DIR>         GENERAL
06/13/00 01:33p          972     Index_htm.txt
01/31/01 03:33p    <DIR>         SCRIPTS
01/31/01 03:34p    <DIR>         scrnS
01/31/01 03:35p    <DIR>         STYLES
Directory of D:\M-9381 US\WEBAPP\FUNCS
01/31/01 03:33p    <DIR>         .
01/31/01 03:35p    <DIR>         ..
01/29/01 11:20a          836     FUNC001_ASP.TXT
01/29/01 11:20a          966     FUNC012_ASP.TXT
01/29/01 11:20a          845     FUNC014_ASP.TXT
01/29/01 11:20a          955     FUNC016_ASP.TXT
01/29/01 11:20a          955     FUNC017_ASP.TXT
01/29/01 11:20a          855     FUNC019_ASP.TXT
01/29/01 11:20a          958     FUNC020_ASP.TXT
01/29/01 11:20a          964     FUNC022_ASP.TXT
01/29/01 11:20a          951     FUNC023_ASP.TXT
01/29/01 11:20a          961     FUNC024_ASP.TXT
01/29/01 11:20a          954     FUNC025_ASP.TXT
01/29/01 11:20a          962     FUNC026_ASP.TXT
01/29/01 11:20a          960     FUNC028_ASP.TXT
01/29/01 11:20a          963     FUNC050_ASP.TXT
01/29/01 11:20a          859     FUNC053_ASP.TXT
01/29/01 11:20a          969     FUNC054_ASP.TXT
01/29/01 11:20a          843     FUNC055_ASP.TXT
01/29/01 11:20a          854     FUNC056_ASP.TXT
01/29/01 11:20a          966     FUNC057_ASP.TXT
01/29/01 11:20a          965     FUNC070_ASP.TXT
01/29/01 11:20a          965     FUNC071_ASP.TXT
01/29/01 11:20a          973     FUNC072_ASP.TXT
01/29/01 11:20a          973     FUNC073_ASP.TXT
01/29/01 11:20a          970     FUNC074_ASP.TXT
01/29/01 11:20a          968     FUNC075_ASP.TXT
01/29/01 11:20a          964     FUNC076_ASP.TXT
01/29/01 11:20a          974     FUNC077_ASP.TXT
01/29/01 11:20a          977     FUNC078_ASP.TXT
01/29/01 11:20a          976     FUNC079_ASP.TXT
01/29/01 11:20a          954     FUNC103_ASP.TXT
01/29/01 11:20a          960     FUNC104_ASP.TXT
01/29/01 11:20a          953     FUNC106_ASP.TXT
```

-continued

```
01/29/01 11:20a          951     FUNC107_ASP.TXT
01/29/01 11:20a          949     FUNC114_ASP.TXT
01/29/01 11:20a          962     FUNC115_ASP.TXT
01/29/01 11:20a          952     FUNC116_ASP.TXT
01/29/01 11:20a          953     FUNC117_ASP.TXT
01/29/01 11:20a          852     FUNC118_ASP.TXT
01/29/01 11:20a          964     FUNC121_ASP.TXT
01/29/01 11:20a          970     FUNC122_ASP.TXT
01/29/01 11:20a          963     FUNC123_ASP.TXT
01/29/01 11:20a          961     FUNC124_ASP.TXT
01/29/01 11:20a          959     FUNC126_ASP.TXT
01/29/01 11:20a          972     FUNC127_ASP.TXT
01/29/01 11:20a          962     FUNC128_ASP.TXT
01/29/01 11:20a          963     FUNC129_ASP.TXT
01/29/01 11:20a          971     FUNC191_ASP.TXT
01/29/01 11:20a          967     FUNC192_ASP.TXT
01/29/01 11:20a          972     FUNC193_ASP.TXT
01/29/01 11:20a          967     FUNC194_ASP.TXT
01/29/01 11:20a          977     FUNC195_ASP.TXT
09/28/00 10:23a          847     FUNC310_ASP.TXT
01/29/01 11:20a          861     FUNC702_ASP.TXT
01/29/01 11:20a          867     FUNC703_ASP.TXT
01/29/01 11:20a          859     FUNC704_ASP.TXT
01/29/01 11:20a          953     FUNC706_ASP.TXT
01/29/01 11:20a          969     FUNC707_ASP.TXT
01/29/01 11:20a          847     FUNC708_ASP.TXT
01/29/01 11:20a          849     FUNC709_ASP.TXT
01/29/01 11:20a          852     FUNC710_ASP.TXT
01/29/01 11:20a          846     FUNC711_ASP.TXT
01/29/01 11:20a          969     FUNC712_ASP.TXT
01/29/01 11:20a          957     FUNC713_ASP.TXT
01/29/01 11:20a          967     FUNC714_ASP.TXT
01/29/01 11:20a          957     FUNC715_ASP.TXT
01/29/01 11:20a          977     FUNC722_ASP.TXT
01/29/01 11:20a          963     FUNC723_ASP.TXT
01/29/01 11:20a          977     FUNC724_ASP.TXT
01/29/01 11:20a          966     FUNC725_ASP.TXT
01/29/01 11:20a          968     FUNC726_ASP.TXT
01/29/01 11:20a          971     FUNC727_ASP.TXT
01/29/01 11:20a          978     FUNC729_ASP.TXT
01/29/01 11:20a          965     FUNC730_ASP.TXT
01/29/01 11:20a          971     FUNC731_ASP.TXT
01/29/01 11:20a          967     FUNC732_ASP.TXT
01/29/01 11:20a          964     FUNC733_ASP.TXT
01/29/01 11:20a          967     FUNC734_ASP.TXT
01/29/01 11:20a          862     FUNC741_ASP.TXT
01/29/01 11:20a          868     FUNC742_ASP.TXT
01/29/01 11:20a          858     FUNC743_ASP.TXT
01/29/01 11:20a          860     FUNC744_ASP.TXT
01/29/01 11:20a          863     FUNC745_ASP.TXT
01/29/01 11:20a          860     FUNC746_ASP.TXT
01/29/01 11:20a          866     FUNC747_ASP.TXT
01/29/01 11:20a          856     FUNC748_ASP.TXT
01/29/01 11:20a          858     FUNC749_ASP.TXT
01/29/01 11:20a          861     FUNC750_ASP.TXT
01/29/01 11:20a          861     FUNC751_ASP.TXT
01/29/01 11:20a          857     FUNC752_ASP.TXT
01/29/01 11:20a          858     FUNC753_ASP.TXT
01/29/01 11:20a          856     FUNC754_ASP.TXT
01/29/01 11:20a          857     FUNC755_ASP.TXT
01/29/01 11:20a          846     FUNC764_ASP.TXT
01/29/01 11:20a          846     FUNC765_ASP.TXT
01/29/01 11:20a          848     FUNC766_ASP.TXT
01/29/01 11:20a          866     FUNC801_ASP.TXT
01/29/01 11:20a          869     FUNC802_ASP.TXT
01/29/01 11:20a          869     FUNC803_ASP.TXT
01/29/01 11:20a          861     FUNC804_ASP.TXT
01/29/01 11:20a          864     FUNC805_ASP.TXT
01/29/01 11:20a          868     FUNC806_ASP.TXT
01/29/01 11:20a          867     FUNC807_ASP.TXT
01/29/01 11:20a          859     FUNC808_ASP.TXT
01/29/01 11:20a          975     FUNC809_ASP.TXT
01/29/01 11:20a          978     FUNC810_ASP.TXT
01/29/01 11:20a          978     FUNC811_ASP.TXT
01/29/01 11:20a          969     FUNC812_ASP.TXT
01/29/01 11:20a          970     FUNC813_ASP.TXT
01/29/01 11:20a          865     FUNC814_ASP.TXT
01/29/01 11:20a          867     FUNC815_ASP.TXT
01/29/01 11:20a          862     FUNC816_ASP.TXT
01/29/01 11:20a          869     FUNC817_ASP.TXT
```

-continued

| | | |
|---|---|---|
| 01/29/01 11:20a | 868 | FUNC818_ASP.TXT |
| 01/29/01 11:20a | 859 | FUNC819_ASP.TXT |
| 01/29/01 11:20a | 860 | FUNC820_ASP.TXT |
| 01/29/01 11:20a | 961 | FUNC899_ASP.TXT |

Directory of D:\M-9381 US\WEBAPP\GENERAL

| | | |
|---|---|---|
| 01/31/01 03:33p | <DIR> | . |
| 01/31/01 03:35p | <DIR> | .. |
| 06/17/99 02:09p | 5,428 | Implicit_asp.txt |
| 06/15/99 01:47p | 532 | LGNERR_asp.txt |
| 05/19/00 03:56p | 11,056 | Splash_asp.txt |
| 05/18/00 12:37p | 4,554 | copyright_htm.txt |
| 12/05/00 06:38p | 15,911 | counter_htm.txt |
| 05/19/00 11:25a | 1,798 | intranetdenied_htm.txt |
| 12/05/00 05:13p | 4,059 | intranethomepage_asp.txt |
| 05/19/00 11:25a | 1,913 | intranetieonly_htm.txt |
| 07/06/00 02:24p | 3,764 | logon_asp.txt |
| 01/29/01 11:20a | 16,715 | menu_asp.txt |
| 05/08/00 02:59p | 2,621 | preload_htm.txt |

Directory of D:\M-9381 US\WEBAPP\SCRIPTS

| | | |
|---|---|---|
| 01/31/01 03:33p | <DIR> | . |
| 01/31/01 03:35p | <DIR> | .. |
| 11/20/00 11:43a | 6,937 | DTL01_SCP.TXT |
| 11/20/00 01:29p | 27,297 | DTL02_SCP.TXT |
| 06/22/99 11:23a | 5,381 | DTL03_SCP.TXT |
| 09/18/00 03:28p | 210 | DTL11_SCP.TXT |
| 09/29/00 11:02a | 6,528 | DTL12_SCP.TXT |
| 10/12/00 05:03p | 10,462 | DTL21_INC.TXT |
| 07/30/99 10:37a | 577 | access_inc.txt |
| 10/12/00 02:02p | 536 | applid_js.txt |
| 10/12/00 02:02p | 525 | applid_scp.txt |
| 06/22/99 10:41a | 852 | brzlib_js.txt |
| 03/26/99 03:59p | 400 | dtlmnu_scp.txt |
| 01/29/01 11:20a | 19,869 | function_scp.txt |
| 06/15/99 01:51p | 4,389 | general_scp.txt |
| 06/24/99 10:46p | 620 | ietest_inc.txt |
| 01/29/01 11:20a | 2,087 | implicit_scp.txt |
| 07/06/00 09:17a | 4,815 | intranetlogon_inc.txt |
| 10/05/00 10:26a | 1,005 | intranetlogon_lst.txt |
| 06/15/99 01:52p | 206 | parkingspot_scp.txt |
| 06/07/99 10:29a | 318 | preload_scp.txt |

Directory of D:\M-9381 US\WEBAPP\SCRNS

| | | |
|---|---|---|
| 01/31/01 03:34p | <DIR> | . |
| 01/31/01 03:35p | <DIR> | .. |
| 01/29/01 11:20a | 2,258 | scrn000_HTM.TXT |
| 01/29/01 11:20a | 4,135 | scrn001_HTM.TXT |
| 01/29/01 11:20a | 6,757 | scrn002_HTM.TXT |
| 01/29/01 11:20a | 7,939 | scrn007_HTM.TXT |
| 01/29/01 11:20a | 52,553 | scrn011_HTM.TXT |
| 01/29/01 11:20a | 12,476 | scrn012_HTM.TXT |
| 01/29/01 11:20a | 17,576 | scrn013_HTM.TXT |
| 01/29/01 11:20a | 20,842 | scrn016_HTM.TXT |
| 01/29/01 11:20a | 21,439 | scrn017_HTM.TXT |
| 01/29/01 11:20a | 10,351 | scrn018_HTM.TXT |
| 01/29/01 11:20a | 18,712 | scrn019_HTM.TXT |
| 01/29/01 11:20a | 12,248 | scrn020_HTM.TXT |
| 01/29/01 11:20a | 10,854 | scrn021_HTM.TXT |
| 01/29/01 11:20a | 10,674 | scrn023_HTM.TXT |
| 01/29/01 11:20a | 32,207 | scrn025_HTM.TXT |
| 01/29/01 11:20a | 10,632 | scrn028_HTM.TXT |
| 01/29/01 11:20a | 2,009 | scrn033_HTM.TXT |
| 01/29/01 11:20a | 24,463 | scrn050_HTM.TXT |
| 01/29/01 11:20a | 21,983 | scrn051_HTM.TXT |
| 01/29/01 11:20a | 16,599 | scrn052_HTM.TXT |
| 01/29/01 11:20a | 28,906 | scrn053_HTM.TXT |
| 01/29/01 11:20a | 17,165 | scrn054_HTM.TXT |
| 01/29/01 11:20a | 25,259 | scrn055_HTM.TXT |
| 01/29/01 11:20a | 35,997 | scrn056_HTM.TXT |
| 01/29/01 11:20a | 16,983 | scrn057_HTM.TXT |
| 01/29/01 11:20a | 35,344 | scrn058_HTM.TXT |
| 01/29/01 11:20a | 35,295 | scrn059_HTM.TXT |
| 01/29/01 11:20a | 27,793 | scrn100_HTM.TXT |
| 01/29/01 11:20a | 13,821 | scrn101_HTM.TXT |
| 01/29/01 11:20a | 15,876 | scrn102_HTM.TXT |
| 01/29/01 11:20a | 102,399 | scrn103_HTM.TXT |
| 01/29/01 11:20a | 13,165 | scrn104_HTM.TXT |
| 01/29/01 11:20a | 24,506 | scrn106_HTM.TXT |
| 01/29/01 11:20a | 12,292 | scrn111_HTM.TXT |
| 01/29/01 11:20a | 15,028 | scrn112_HTM.TXT |
| 01/29/01 11:20a | 17,741 | scrn140_HTM.TXT |
| 01/29/01 11:20a | 9,836 | scrn141_HTM.TXT |
| 01/29/01 11:20a | 40,463 | scrn142_HTM.TXT |
| 01/29/01 11:20a | 13,301 | scrn143_HTM.TXT |
| 01/29/01 11:20a | 9,975 | scrn186_HTM.TXT |
| 01/29/01 11:20a | 20,287 | scrn190_HTM.TXT |
| 01/29/01 11:20a | 22,630 | scrn191_HTM.TXT |
| 01/29/01 11:20a | 36,172 | scrn192_HTM.TXT |
| 01/29/01 11:20a | 118,630 | scrn193_HTM.TXT |
| 01/29/01 11:20a | 20,610 | scrn194_HTM.TXT |
| 01/29/01 11:20a | 42,586 | scrn196_HTM.TXT |
| 01/29/01 11:20a | 31,063 | scrn199_HTM.TXT |
| 01/29/01 11:20a | 42,613 | scrn301_HTM.TXT |
| 01/29/01 11:20a | 5,059 | scrn302_HTM.TXT |
| 01/29/01 11:20a | 15,551 | scrn303_HTM.TXT |
| 01/29/01 11:20a | 51,827 | scrn304_HTM.TXT |
| 01/29/01 11:20a | 24,470 | scrn305_HTM.TXT |
| 01/29/01 11:20a | 27,070 | scrn306_HTM.TXT |
| 01/29/01 11:20a | 46,332 | scrn308_HTM.TXT |
| 01/29/01 11:20a | 53,218 | scrn310_HTM.TXT |
| 01/29/01 11:20a | 30,568 | scrn701_HTM.TXT |
| 01/29/01 11:20a | 45,497 | scrn702_HTM.TXT |
| 01/29/01 11:20a | 19,933 | scrn703_HTM.TXT |
| 01/29/01 11:20a | 39,375 | scrn704_HTM.TXT |
| 01/29/01 11:20a | 16,408 | scrn705_HTM.TXT |
| 01/29/01 11:20a | 27,433 | scrn706_HTM.TXT |
| 01/29/01 11:20a | 21,786 | scrn707_HTM.TXT |
| 01/29/01 11:20a | 36,503 | scrn708_HTM.TXT |
| 01/29/01 11:20a | 29,499 | scrn709_HTM.TXT |
| 01/29/01 11:20a | 44,583 | scrn710_HTM.TXT |
| 01/29/01 11:20a | 18,586 | scrn711_HTM.TXT |
| 01/29/01 11:20a | 36,156 | scrn712_HTM.TXT |
| 01/29/01 11:20a | 23,476 | scrn713_HTM.TXT |
| 01/29/01 11:20a | 47,967 | scrn714_HTM.TXT |
| 01/29/01 11:20a | 10,842 | scrn717_HTM.TXT |
| 01/29/01 11:20a | 39,203 | scrn718_HTM.TXT |
| 01/29/01 11:20a | 49,165 | scrn723_HTM.TXT |
| 01/29/01 11:20a | 51,030 | scrn724_HTM.TXT |
| 01/29/01 11:20a | 26,405 | scrn727_HTM.TXT |
| 01/29/01 11:20a | 55,914 | scrn728_HTM.TXT |
| 01/29/01 11:20a | 49,670 | scrn729_HTM.TXT |
| 01/29/01 11:20a | 50,601 | scrn730_HTM.TXT |
| 01/29/01 11:20a | 24,118 | scrn731_HTM.TXT |
| 01/29/01 11:20a | 40,247 | scrn732_HTM.TXT |
| 01/29/01 11:20a | 2,858 | scrn901_HTM.TXT |
| 01/29/01 11:20a | 4,185 | scrn903_HTM.TXT |
| 01/29/01 11:20a | 31,788 | scrn999_HTM.TXT |

Directory of D:\M-9381 US\WEBAPP\STYLES

| | | |
|---|---|---|
| 01/31/01 03:35p | <DIR> | . |
| 01/31/01 03:35p | <DIR> | .. |
| 04/12/99 12:09p | 332 | props_css.txt |
| 06/22/99 11:19a | 844 | scrns_css.txt |

Total Files Listed:
866 File(s)  41,467,133 bytes

The contents of the compact disk are a part of the present disclosure, and are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field

The present invention relates generally to pricing systems and, in particular, to a system and method of real-time pricing.

2. Description of the Related Art

Many products and services are commodities that are sold in very competitive markets. New competition can also come, for example, from product and service improvements, new products, new services, lower prices, new technology, the use of the Internet, mergers, and acquisitions. Pricing is often a major factor in a customer's decision as to what product or service to purchase or use. In many markets, the capability to manage pricing strategies better than the competition can be the competitive advantage that is needed to succeed in the competitive market.

Many different pricing strategies have been developed by companies to gain a competitive advantage over the competition. One such strategy employed by companies is "volume discounting." Companies provide volume discounts to influence consumers to purchase its products and services. Volume discounting affords the benefits of a large number or quantity of purchases, typically within a set period of time (e.g., a billing cycle). A consumer benefits from his or her prior purchases in that all the purchases in a billing cycle are considered in applying the volume discount.

Because the total volume of products or services purchased by a consumer is not known until the end of a billing cycle, the volume discount, and as a result, the actual price of the product or service as it applies to the consumer, cannot be determined until the end of a billing cycle. Thus, even though pricing may be a major or deciding factor in a consumer's decision, currently, the benefit afforded by volume discounting is determined at the end of a billing cycle. At the time the consumer considers making a product or service purchase, the consumer is provided a price that fails to account for volume discounting and, as a result, is likely higher than the price the consumer might end up paying.

Thus, the consumer is likely to base his or her purchasing decision on an incorrect price, such as, by way of example, a unit price (e.g., a price that does not take into consideration volume discounting). A company can benefit greatly by being able to provide a price that is closer to the actual price the consumer is likely to pay after accounting for the volume discounts, especially if it is a lower price. Therefore, what is needed is an infrastructure that enables a company to manage its pricing strategies and to provide a price that is more indicative of the price the consumer will ultimately pay.

SUMMARY

The present disclosure is directed to a system and corresponding methods that facilitate the calculation of a real-time price for a transaction during a billing cycle that accounts for volume discounts resulting from transactions that occurred previously during the billing cycle. A data processing system maintains a record of the transactions that occur during a billing cycle. The data processing system then calculates a real-time price quote for the transaction by applying volume discounts resulting from the transactions that previously occurred during the billing cycle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for pricing transactions in real-time includes: receiving a request for a real-time price quote for a transaction from a first account, the request being received at a first instance in time during a billing cycle; determining a first production service, the first production service being a component of the transaction; determining a count of first production service instances representing the first production service in the received transaction; determining a billable entity for the transaction, the billable entity comprising one or more related accounts, wherein the related accounts includes the first account; determining a total of the first production service instances purchased by the related accounts during the billing cycle up to the first instance in time, the total including the count of the first production service instances in the received transaction; determining a price applicable to the total of the first production service instances based on a pricing method; and apportioning the price to the received transaction based on the count of the first production service instance in the received transaction.

In another embodiment, a method for real-time pricing includes: receiving a request for a real-time price quote for a transaction, the request being received at a first instance in time during a billing cycle, wherein the transaction comprises a number of first production service instances, each first production service instance representing a first production service; determining a total count of production service instances consumed during the billing cycle up to the first instance in time based on a pricing relationship; determining a billing service appropriate for the first production service; calculating a price for the first production service from a price table based on a first attribute for the billing service and the total count of production service instances consumed; and apportioning the price to the received transaction based on the number of first production service instances in the transaction.

In still another embodiment, a computer-readable storage medium has stored thereon computer instructions that, when executed by a computer, cause the computer to: receive a request for a real-time price quote for a transaction, the request being received at a first instance in time during a billing cycle, wherein the transaction comprises a number of first production service instances, each instance representing a first production service; determine a total count of production service instances consumed during the billing cycle up to the first instance in time based on a pricing relationship; determine a billing service appropriate for the first production service; calculate a price for the first production service from a price table based on a first attribute for the billing service and the total count of production service instances consumed; and apportion the price to the received transaction based on the number of first production service instances in the transaction.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

Figure 1:
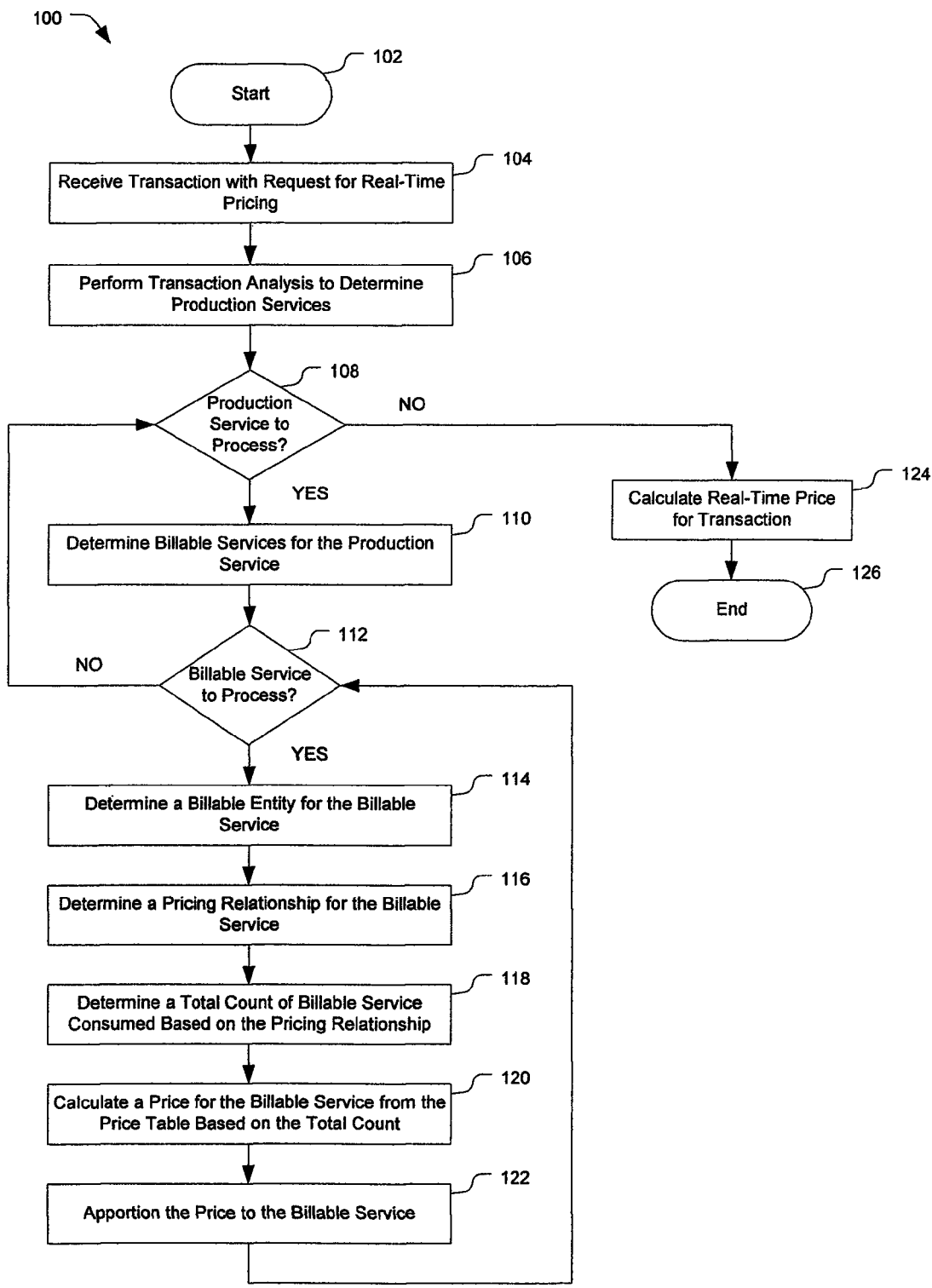
FIG. 1 illustrates a flow chart of an exemplary method for calculating a real-time price with volume discounting.

According to this invention, certain limitations imposed by conventional pricing systems have been overcome.

A data processing system and corresponding methods, according to an embodiment of the present invention, facilitates a real-time pricing of a transaction with volume discounting. "Transaction" here generally refers to a product or service that is offered by a provider (e.g., manufacturer, retailer, wholesaler, distributor, service provider, etc.) for consumption by one or more consumers. In one embodiment, the provider may be the operator of the data processing system. In another embodiment, the provider may purchase the services offered by the data processing system as disclosed herein from the operator or administrator of the data processing system (e.g., the provider of the transaction is different from the provider of the data processing system services).

In one embodiment, the data processing system receives during a billing cycle a request for a real-time price quote for a transaction from, for example, an account. The account may be a consumer of the transaction. The billing cycle specifies a time duration (e.g., day, week, month, quarter, year), at the end of which the account is billed for the transactions consumed or purchased during the billing cycle.

The data processing system analyzes the transaction to determine the transaction's various components. The transaction provider may define the components of the transaction. The conversion of the transaction into its components allows the transaction provider to determine the cost of the transaction, in component parts, which in turn, enable the transaction provider to determine an appropriate price for the transaction. A suitable database system for implementing the transaction analysis in accordance with the present invention is described in U.S. Pat. No. 6,052,672, entitled "DATA PROCESSING SYSTEM FOR COMPLEX PRICING AND TRANSACTIONAL ANALYSIS," which is hereby incorporated by reference in its entirety. However, other database systems can be used to implement a data processing system using the principles described herein.

In one embodiment, the data processing system calculates a real-time price for the transaction during a billing cycle as if it was the end of the billing cycle. The data processing system breaks down the transaction into its component parts. The component parts are then priced by applying a volume discount applicable to each component to determine a real-time price for each component. The data processing system then totals the real-time price of the components to determine the real-time price of the transaction.

The volume discount for a component may result from pricing relationships between parties (e.g., relationships between a number of components, accounts, customers, etc.) and the prior purchases of the component during the billing cycle up to this time by the parties in the pricing relationship. The data processing system applies the volume discount applicable to a component to determine the price of the component. Thus, the data processing system applies all the relationship pricing and volume discounting known during the billing cycle up to the time when it received the request for quote to determine the real-time price of the transaction.

In another embodiment, the data processing system calculates a variance to the real-time transaction price. At the end of the billing cycle, the data processing system calculates a price for each transaction purchased during the billing cycle. In one embodiment, the data processing system calculates a price for the transaction by determining a price for each component of a transaction in the manner outlined above. This price is then compared to the real-time price quoted during the billing cycle (e.g., at the time the request for real-time price quote is received). If there is a variance or difference between the two prices, the data processing system may make or report adjustments as necessary. For example, there may have been subsequent purchases of a component of the transaction after the time of providing the real-time price quote. The subsequent purchases of the component may result in a larger volume discount, which, in turn, causes a variance in price (e.g., results in a lower price for the transaction).

Even though this invention is suitable to providing real-time pricing of various products and services in many industries (e.g., financial services, internet services, telecommunication services, etc.), the invention will be further disclosed in the context of the data processing system providing real-time pricing with volume discounting of financial products offered by a financial services company (FSC), such as, retail bank, wholesale bank, corporate bank, and investment bank.

Figure 2:
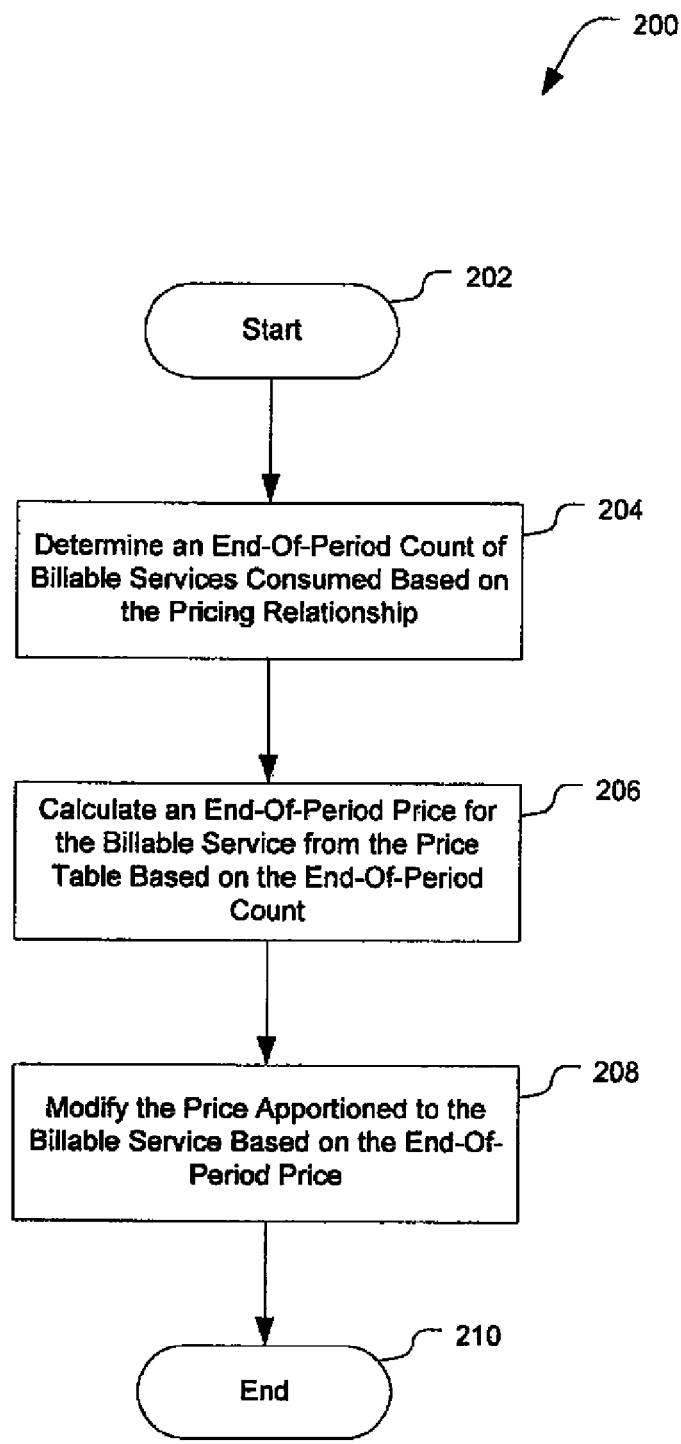
FIG. 2 illustrates a flow chart of an exemplary method for calculating a variance to a real-time price with volume discounting.

Embodiments of the present invention are understood by referring to FIGS. 1-2 of the drawings. Throughout the drawings, components that correspond to components shown in previous figures are indicated using the same reference numbers.

The detailed description that follows is presented in terms of processes and symbolic representations of operations performed by conventional computers.

Transaction Overview

A transaction instance (e.g., financial transaction instance) takes place when a FSC provides a financial service and when a client or consumer purchases or consumes the financial service. For example, an FSC may provide one or more financial services that are bundled together and offered to clients as financial transactions. Examples of financial transactions are checking accounts, cash management accounts, mortgages, funds transfers, safe deposit boxes, and the like.

In one embodiment, an FSC can use the data processing system to provide a real-time pricing of one or more financial transactions. Each financial transaction is defined in the data processing system in its component parts called production services. Thus, a financial transaction is related to the production services that map to or make up the financial transaction. The production services defining a particular financial transaction are the individual actions that the FSC performs or that the FSC wishes to account for in performing or processing the financial transaction. Production services for a financial transaction may include, by way of example, debit from an account, credit to an account, over draft approval, and computer connection. Production services are akin to a bill of materials for a manufacturer in that each transaction can be defined by the production services that are required to build or provide that transaction.

For clarity, the language of U.S. Pat. No. 6,052,672 is used herein. In particular, to distinguish an actual occurrence of a financial transaction performed by an FSC from a representation of the financial transaction in the data processing system, the actual occurrence of the financial transaction will be referred to as a financial transaction instance. Similarly, a production service instance is the representation of an actual occurrence of a specific production service performed by the FSC.

A production service is further defined in the data processing system in its component parts called billing or billable services. Billing services and billable service are used interchangeably herein. The billable services are related to activities having a cost or price, enabling the FSC to determine the cost of providing the financial transaction and the fees or prices the FSC is going to derive, earn, or charge the consumer (e.g., account) of the transaction. In one embodiment, the billable services are what appear on an accounting statement sent to the consumer. Thus, the consumer is informed of the transactions consumed, the related production services consumed, the related billable services consumed, and the price charged for each of the billable services.

A billable service may be mapped to one or more price tables in the data processing system. The cost and/or price associated with a billable service is recorded in a price table. The price table includes pricing rules for the associated billable service.

The data processing system maintains records for one or more billable entities. "Billable entity" here generally refers to a grouping of accounts for the purpose of applying volume discounting. Volume discounting may span the activity of the accounts within the billable entity. An account may be thought of as the consumer of the transaction. For example, a customer may actually be many companies or related companies that may be transacting with the FSC on one or more accounts. The billable entity is a composition of the accounts without regard to who the customers are, or whether one customer is involved or more than one customers are involved. Thus, volume discounting may span the activity of the accounts within a particular billable entity without regard to who the actual customers are or the number of customers involved in the billable entity.

In one embodiment, the data processing system provides for relationship pricing in conjunction with volume discounting. A pricing relationship may exist between a number of billable services, accounts, customers, and the like. For relationship pricing, the billable services, accounts, or customers in a relationship are factored in calculating a real-time price for a transaction. Relationship pricing in conjunction with volume discounting is an application of the volume discount based on the activities of the elements (i.e., billable services, accounts, customers) in a particular pricing relationship.

For example, as explained above, a group of accounts may be grouped together in a billable entity, creating a pricing relationship for the purposes of applying a volume discount. In another example, a group of billable services may be grouped together, creating a pricing relationship for the purposes of applying a volume discount. The volume discount is determined from the activity of the billable services within the group across all accounts in a particular billing entity. In still another example, a pricing relationship can exist for a group of accounts (e.g., not a complete billing entity) for a particular billable service. The volume discount is determined from the activity of the particular billing service across the group of accounts.

Billable services, pricing of billable services, pricing relationships, and relationship pricing is further described in U.S. Pat. No. 6,052,672. Pricing methods, including volume discounting is further described in the co-pending and commonly owned U.S. patent application Ser. No. 09/183/335 entitled "DATA PROCESSING SYSTEM FOR PRICING, COSTING AND BILLING OF FINANCIAL TRANSACTIONS."

Method for Calculating a Real-Time Price with Volume Discounting

In one embodiment, the data processing system facilitates the calculation of a real-time price for a financial transaction with volume discounting at any time in a billing cycle. The data processing system contains data and program logic to receive a request to provide a real-time price quote for a financial transaction and calculates a real-time price that includes applicable volume discounts. The data processing system calculates the real-time price for the financial transaction irrespective of point in time within a particular billing cycle. The volume discounting is determined from pricing relationships provided by the data processing system.

FIG. 1 illustrates a flow chart of an exemplary method 100 for calculating a real-time price of a financial transaction with volume discounting. Beginning at a start step 102, an FSC creates and defines the financial transactions and the mapping rules for the transactions, including the production services and the billing services, as maintained in the data processing system. The FSC also creates and defines the billing entities, accounts, pricing relationships, etc. maintained in the data processing system.

For example, the FSC defines a "wire transfer" as one financial transaction. The wire transfer is mapped to include three production services: "debit from account," "credit to account," and "overdraft protection." Each of the production services is mapped to a respective billable service, and each billable service is respectively mapped to a price table. The FSC may create a billing entity to include four accounts: "Account A," "Account B," "Account C," and "Account D." Accounts A and B belong to Company ABC, and Accounts C and D belong to Company XYZ. The FSC sets a monthly billing cycle for the billing entity.

Furthermore, the FSC may agree to and create a pricing relationship for Accounts A, B, and C for the overdraft protection service. The pricing relationship entitles Accounts A, B, and C to the following volume discounting for the overdraft protection service:

| | |
|---|---|
| Quantity 1 to 20 | $4.00/each |
| Quantity 21 to 50 | $3.00/each |
| Quantity 51 to 100 | $2.00/each |
| Quantity 100+ | $1.00/each |

Thus, if the combined volume of overdraft protections used or purchased by the group of accounts in the pricing relationship (Accounts A, B, and C) exceed twenty, all the volume of overdraft protections purchased is priced at $3.00 each. Likewise, if the combined volume of overdraft protections purchased by the group of accounts in the pricing relationship exceed fifty or one hundred, all the volume of overdraft protections purchased is priced at $2.00 each or $1.00 each, respectively. Otherwise, the first twenty overdraft protections are priced at $4.00 each.

At step 104, the FSC receives a request for a real-time price quote for a financial transaction from a customer. Typically, the customer establishes one or more accounts with the FSC, and specifies a particular account in requesting the real-time quote for the financial transaction. In particular, the financial transaction data and the request for the real-time price quote is input into, and received by the data processing system. Continuing the wire transfer example, Company ABC, using Account A, may request a real-time price quote for a wire transfer. The request may have been submitted during a billing cycle, for example, the tenth day of the month.

At step 106, the data processing system performs transaction analysis on the financial transaction to determine the associated production services. In the above example, the data processing system determines that the wire transfer maps to, and is associated with the debit from account, credit to account, and overdraft protection production services.

At step 108, the data processing system determines if there is a production service to process or if it has processed all the production services. If there is a production service to process, the data processing system identifies the production service and determines the appropriate billable services associated with the identified production service at step 110. A production service may map to one or more billable services. Continuing the above example, the data processing system may start by processing the overdraft protection production service (step 108). The data processing system then determines that the overdraft protection service maps to a single billable service (step 110).

At step 112, the data processing system determines if there is a billable service to process. If all the billable services for the production service have been processed, the data processing system returns to step 108 to process the next production service. If there is a billable service to process, the data processing system identifies the billable service and determines the billing entity (i.e., billable entity) for the billable service at step 114. Continuing the above example, the data processing system determines that for the overdraft protection service, it has to process the associated billable service (step 112) and that the billing entity includes Accounts A, B, C, and D (step 114).

At step 116, the data processing system determines if there is a pricing relationship established for the billable service. Continuing the above example, the data processing system determines that a pricing relationship exists between Accounts A, B, and C for the overdraft protection service. Thus, for the billable service associated with the overdraft protection service requested by Account A, an applicable pricing relationship exists.

At step 118, the data processing system determines the total count of the billable service consumed or purchased by the accounts in the pricing relationship. The data processing system maintains a record of the number of the number of billable service instances purchased by the accounts in the pricing relationship. Continuing the above example, the data processing system determines the number of billable service instances purchased by Accounts A, B, and C up to this point (i.e., tenth day) in the current billing cycle. For example, in this current billing cycle, a total of fifty overdraft protections may have been purchased (none by Account A, twenty by Account B, and thirty by Account C). Thus, the current overdraft protection would be the fifty-first purchased in the current billing cycle.

At step 120, the data processing system calculates a price for the billable service from an associated price table based on the total number of billable service instances. The data processing system applies any applicable volume discount resulting from the billable service instances purchased by the accounts in the pricing relationship. Continuing the above example, the data processing system determines from the price table for the billable service associated with the overdraft protection service that the fifty-first overdraft protection instance purchased results in all the overdraft protection instances purchased by the group of accounts in the pricing relationship to be priced at $2.00 each. Thus, fifty-one overdraft protection instances is priced at a total price of $102.00.

At step 122, the data processing system apportions the portion of the total price for the billable service instances to the current billable service being processed. Continuing the above example, the data processing system apportions a price of $2.00 ($\frac{1}{51}$ of the total price of $102.00) to the current billable service associated with the overdraft protection. Thus, the current billable service associated with the overdraft protection is priced at $2.00. Thus, Account A benefits from the billable service instances purchased by Accounts B and C. Company ABC (Account A) receives a volume discount as a result of purchases made by Company XYZ (Account C). The data processing system then returns to step 112 to continue processing the next billable service associated with the overdraft protection service.

The data processing system processes the other production services (i.e., debit from account and credit to account) associated with the financial transaction (i.e., wire transfer) in the manner described above. If, at step 108, all the production services for the financial transaction have been processed, the data processing system calculates the real-time price quote for the requested financial transaction at step 124. The financial transaction price is determined by summing the prices of the associated billable services. The data processing system provides the real-time price quote and ends at step 126.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Method for Calculating a Variance to a Real-Time Price

In one embodiment, the data processing system recalculates the price for the financial transactions and the associated billable services at the end of the billing cycle to account for and accommodate changes that occurred during a billing cycle. The recalculation may result in a variance to the real-time price quoted and charged for a financial transaction to an account during the billing cycle. A variance to the price may result from reasons such as, by way of example, a change to a billing entity resulting in a change in applicable price table(s), a change to an allocation of an account to different departments or market segments resulting in a change in applicable price table(s), a new price becoming effective during a billing cycle, a change in a pricing relationship, additional financial transactions purchased during a billing cycle, and the like. The data processing system may report the variances between the real-time price and the end-of-billing cycle price to the FSC, for example, as either discounts or adjustments.

FIG. 2 illustrates a flow chart of an exemplary method 200 for calculating a variance to a real-time price with volume discounting. Beginning at a start step 202, the data processing system identifies the financial transactions that occurred during the prior billing cycle. The data processing system may perform a transaction analysis for each financial transaction and determine the associated production services and billable services.

At step 204, the data processing system performs an end-of-billing cycle pricing for each billable service instance that occurred during the just ended billing cycle. In particular, the data processing system, for each billable service instance, determines the account that purchased the billable service instance. The data processing system identifies any applicable pricing relationships for the account. For example, there may have been a change in the pricing relationship. Continuing the above wire transfer example, the pricing relationship may have been changed during the billing cycle to include Account D, and Account D may have purchased forty overdraft protections during the billing cycle.

The data processing system determines an end-of-billing cycle count of the total number of billable service instances purchased by the accounts during the recently ended billing cycle. Continuing the above wire transfer example, between the tenth day of the billing cycle and the end of the billing cycle, Account A may have purchased an additional nine-teen overdraft protection services, for a total of twenty, at a price of $2.00 each. Thus, the accounts in the pricing relationship at the end of the billing cycle (Accounts A, B, C, and D) purchased a total of one hundred and ten overdraft protection services (twenty by Account A, twenty by Account B, thirty by Account C, and forty by Account D).

At step 206, the data processing system calculates an end-of-billing cycle price for the billable service instances purchased during the billing cycle from the associated price table based on the end-of-billing cycle count. Continuing the above example, the data processing system determines from the price table that at a volume of one hundred and ten overdraft protection services, all the overdraft protection instances purchased by the accounts in the pricing relationship should be charged $1.00 each. Thus, the one hundred and ten overdraft protection instances is priced at a total of $110.00.

At step 208, the data processing system modifies the price apportioned to the billable service based on the end-of-billing cycle price. The data processing system calculates the variance between the real-time price quoted and charged for each billable service instance and the end-of-billing cycle price for the billable service instance. Continuing the above example, the data processing system determines that Account A was charged a total price of $40.00 ($2.00 for each overdraft protection service) for the twenty overdraft protection service instances purchased during the billing cycle. The data processing system calculates the end-of-billing cycle price for the twenty overdraft protection service instances purchased by Account A to be $20.00 ($1.00 for each overdraft protection service). Thus, there is a variance of $20.00 for the twenty overdraft protections service instances purchased by Account A.

The data processing system calculates the variance for the remaining billable services and ends at step 210. In one embodiment, the data processing system generates a report to the FSC to report the end-of-billing cycle pricing. The report may include the calculated variances for each billable service, financial transaction, account, billing entity, etc. Thus, the data processing system efficiently adjusts to and incorporated changes to the billing parameters that occur during a billing cycle.

In one embodiment, a price variance may result from a change to an allocation of an account to a different department or market segment. This may result in a change to one or more applicable price tables for a billable service. The change the applicable price tables may affect the volume discount calculation and any applicable exception pricing calculation. Implementation of exception pricing is described in U.S. Pat. No. 6,052,672.

As described herein, the present invention in at least one embodiment facilitates a real-time pricing of a financial transaction during a billing cycle that accounts for applicable volume discounts. One embodiment of the present invention provides a data processing system that receives and processes a request to provide a real-time price quote for a financial transaction. The data processing system maintains a record of the billable service instances purchased during the billing cycle, and is able to account for applicable volume discounts in calculating a real-time price quote for the financial transaction at any instance in time during the billing cycle.

In at least one embodiment, the data processing system maintains a record of one or more pricing relationships. A pricing relationship may include one or more accounts, one or more services, or a combination or one or more accounts and services. The data processing system maintains a record of the billable service instances purchased by the accounts in an applicable pricing relationship, and is able to account for the applicable volume discounts resulting from the pricing relationship in calculating a real-time price quote for the financial transaction during the billing cycle.

In at least one embodiment, the data processing system performs an end-of-billing period price calculation to identify variances to the real-time price quotes generated during the billing cycle. The calculated variances are reported to the FSC as discounts or adjustments to the price of the financial transactions. The data processing system permits changes to be made during a billing cycle, and the changes are reflected in the previously calculated and quoted real-time prices.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. In a computerized data processing system, a computer-implemented method for pricing transactions for a billable entity comprising related accounts over a billing cycle, comprising:

for each transaction to be priced, at the time the transaction takes place:
identifying from the transaction one or more production services, wherein one or more instances of each production service are components of the transaction; and
for each production service identified from the transaction:
counting the instances of the production service in the transaction;
determining a total number of instances of the production service associated with all transactions of the billable entity that are provided during the billing cycle up to and including the transaction;
determining a price applicable to the total number of instances of the production service according to a pricing method applicable to the production service or the billable entity at the time of the transaction; and
apportioning the price to the transaction based on the number of instances of the production service in the transaction;
at the end of the billing cycle, for each production service, calculating a variance to the price apportioned to each transaction for the production service, the variance being calculated using a method comprising:
determining an end-of-period total number of instances of the production service associated with the billable entity provided during the billing cycle;
determining an end-of-period pricing method applicable to the production service or the billable entity at the end of the billing cycle;
according to the end-of-period pricing method, determining an end-of-period price applicable to the end-of-period total number of instances of the production service; and
calculating the variance for the production service by determining a difference between the end-of-period price and the price apportioned to the transaction; and
modifying the price apportioned to each transaction for each production service using the variance calculated for the production service in the transaction; and
wherein all of the above steps are performed by the computerized data processing system.

2. The method of claim 1, further comprising notifying a customer related to the billable entity of the variances in the transactions by mail, email, website, phone, radio or television.

3. The method of claim 1, wherein the related accounts of the billable entity change during the billing cycle.

4. The method of claim 1, wherein the pricing method at the time of one of the transactions or at end-of-period is a flat fee method.

5. The method of claim 1, wherein the pricing method at the time of one of the transactions or at end-of-period is a minimum revenue method.

6. The method of claim 1, wherein the pricing method at the time of one of the transactions or at end-of-period is a tiering method.

7. The method of claim 1, wherein the pricing method at the time of one of the transactions or at end-of-period is a volume discount method.

8. The method of claim 1, further comprising, for each production service at the time of each transaction:
   determining a billable service related to the production service; and
   determining a price table applicable to the billable service or the billable entity.

9. In a computerized data processing system, a computer-implemented method for pricing transactions for a billable entity comprising related accounts over a billing cycle, comprising:
   for each transaction to be priced, at the time the transaction takes place:
      identifying from the transaction one or more production services, wherein one or more instances of each production service are components of the transaction; and
      for each production service identified:
         identifying one or more billable services applicable to the production service;
         identifying the instances of the production service in the transaction;
         determining the number of instances of each of the identified billable services applicable to the identified instances of the product service;
      for each billable service identified:
         determining a total number of instances of the billable service associated with all transactions of the billable entity that are provided during the billing cycle up to and including the transaction;
         determining a price applicable to the total number of instances of the billable service using a price table applicable to the billable service or the billable entity, the price being calculated according to a pricing method applicable to the price table for the billable service at the time of the transaction; and
         apportioning the price to the transaction based on the number of instances of the billable service applicable to the transaction;
   at the end of the billing cycle, for each billable service, calculating a variance to the price apportioned to each transaction for the billable service, the variance being calculated using a method comprising:
      determining an end-of-period total number of instances of the billable service associated with the billable entity provided during the billing cycle;
      determining an end-of-period pricing method and price table applicable to the billable service or the billable entity at the end of the billing cycle;
      according to the end-of-period pricing method and using the end-of-period price table, determining an end-of-period price applicable to the end-of-period total number of instances of the billable service; and
      calculating the variance by determining a difference between the end-of-period price and the price apportioned to the transaction; and
   modifying the price apportioned to each transaction for each billable service using the variance calculated for the transaction; and wherein all of the above steps are performed by the computerized data processing system.

10. The method of claim 9, further comprising notifying a customer related to the billable entity of the variances in the transactions by mail, email, website, phone, radio or television.

11. The method of claim 9, wherein the related accounts of the billable entity change during the billing cycle.

12. The method of claim 9, wherein the pricing method at the time of one of the transactions or at end-of-period is a flat fee method.

13. The method of claim 9, wherein the pricing method at the time of one of the transactions or at end-of-period is a minimum revenue method.

14. The method of claim 9, wherein the pricing method at the time of one of the transactions or at end-of-period is a tiering method.

15. The method of claim 9, wherein the pricing method at the time of one of the transactions or at end-of-period is a volume discount method.

16. A computer-readable storage device in a data processing system, including computer-executable instructions for carrying out a method in a computer for pricing transactions for a billable entity comprising related accounts over a billing cycle, the method comprising:
   for each transaction to be priced, at the time the transaction takes place:
      identifying from the transaction one or more production services, wherein one or more instances of each production service are components of the transaction; and
      for each production service identified:
         counting the instances of the production service in the transaction;
         determining a total number of instances of the production service associated with all transactions of the billable entity that are provided during the billing cycle up to the time of the transaction, the total number of instances including the instances of the production service of the transaction;
         determining a price applicable to the total number of instances of the production service according to a pricing method applicable to the production service or the billable entity at the time of the transaction; and
         apportioning the price to the transaction based on the number of instances of the production service in the transaction;
   at the end of the billing cycle, for each production service, calculating a variance to the price apportioned to each transaction for the production service, the variance being calculated using a method comprising:
      determining an end-of-period total number of instances of the production service associated with the billable entity provided during the billing cycle;
      determining an end-of-period pricing method applicable to the production service or the billable entity at the end of the billing cycle;
      according to the end-of-period pricing method, determining an end-of-period price applicable to the end-of-period total number of instances of the production service; and
      calculating the variance by determining a difference between the end-of-period price and the price apportioned to the transaction; and modifying the price apportioned to each transaction for each production service using the variance calculated for the transaction.

17. The computer-readable storage device of claim 16, wherein the method carried out in the computer further comprising notifying a customer related to the billable entity of the variances in the transactions by mail, email, website, phone, radio or television.

18. The computer-readable storage device of claim 16, wherein the related accounts of the billable entity change during the billing cycle.

19. The computer-readable storage device of claim 16, wherein the pricing method at the time of one of the transactions or at end-of-period is a flat fee method.

20. The computer-readable storage device of claim 16, wherein the pricing method at the time of one of the transactions or at end-of-period is a minimum revenue method.

21. The computer-readable storage device of claim 16, wherein the pricing method at the time of one of the transactions or at end-of-period is a tiering method.

22. The computer-readable storage device of claim 16, wherein the pricing method at the time of one of the transactions or at end-of-period is a volume discount method.

23. The computer-readable storage device of claim 16, further comprising, for each production service at the time of each transaction:
   determining a billable service related to the production service; and
   determining a price table applicable to the billable service or the billable entity.

24. A computer-readable storage device in a data processing system, including computer-executable instructions for carrying out a method in a computer for pricing transactions for a billable entity comprising related accounts over a billing cycle, the method comprising:
   for each transaction to be priced, at the time the transaction takes place:
      identifying from the transaction one or more production services, wherein one or more instances of each production service are components of the transaction; and
      for each production service identified:
         determining one or more billable services applicable to the production service;
         identifying the instances of the production service in the transaction;
         determining the number of instances of each of the identified billable services applicable to the identified instances of the production services;
      for each billable service identified:
         determining a total number of instances of the billable service associated with all transactions of the billable entity that are provided during the billing cycle up to the time of the transaction, the total number of instances including the instances of the billable service applicable to the transaction;
         determining a price applicable to the total number of instances of the billable service using a price table applicable to the billable service or the billable entity, the price being calculated according to a pricing method applicable to the price table for the billable service at the time of the transaction; and
         apportioning the price to the transaction based on the number of instances of the billable service applicable to the transaction;
   at the end of the billing cycle, for each billable service, calculating a variance to the price apportioned to each transaction for the billable service, the variance being calculated using a method comprising:
      determining an end-of-period total number of instances of the billable service associated with the billable entity provided during the billing cycle;
      determining an end-of-period pricing method and price table applicable to the billable service or the billable entity at the end of the billing cycle;
      according to the end-of-period pricing method and using the end-of-period price table, determining an end-of-period price applicable to the end-of-period total number of instances of the billable service; and
      calculating the variance by determining a difference between the end-of-period price and the price apportioned to the transaction; and
   modifying the price apportioned to each transaction for each billable service using the variance calculated for the transaction.

25. The computer-readable storage device of claim 24, further comprising notifying a customer related to the billable entity of the variances in the transactions by mail, email, website, phone, radio or television.

26. The computer-readable storage device of claim 24, wherein the related accounts of the billable entity change during the billing cycle.

27. The computer-readable storage device of claim 24, wherein the pricing method at the time of one of the transactions or at end-of-period is a flat fee method.

28. The computer-readable storage device of claim 24, wherein the pricing method at the time of one of the transactions or at end-of-period is a minimum revenue method.

29. A computer-readable storage device of claim 24, wherein the pricing method at the time of one of the transactions or at end-of-period is a tiering method.

30. The computer-readable storage device of claim 24, wherein the pricing method at the time of one of the transactions or at end-of-period is a volume discount method.

* * * * *